(12) United States Patent
Penn

(10) Patent No.: US 12,138,787 B2
(45) Date of Patent: *Nov. 12, 2024

(54) POSITIONING SYSTEM

(71) Applicant: James Douglass Penn, Cambridge, MS (US)

(72) Inventor: James Douglass Penn, Cambridge, MS (US)

(*) Notice: Subject to any disclaimer, the term of this patent is extended or adjusted under 35 U.S.C. 154(b) by 0 days.

This patent is subject to a terminal disclaimer.

(21) Appl. No.: 17/731,705

(22) Filed: Apr. 28, 2022

(65) Prior Publication Data

US 2022/0324096 A1    Oct. 13, 2022

Related U.S. Application Data

(63) Continuation of application No. 14/727,851, filed on Jun. 1, 2015, now Pat. No. 11,331,789.
(Continued)

(51) Int. Cl.
*B25J 9/02* (2006.01)
*B25J 9/10* (2006.01)
*F16H 19/06* (2006.01)

(52) U.S. Cl.
CPC ............ *B25J 9/023* (2013.01); *B25J 9/026* (2013.01); *B25J 9/1045* (2013.01);
(Continued)

(58) Field of Classification Search
CPC .......... B25J 9/023; B25J 9/104; B25J 9/1045; G01D 9/40; F16H 19/06; F16H 2019/069
(Continued)

(56) References Cited

U.S. PATENT DOCUMENTS 2,857,032 A   10/1958   Johnson
3,379,834 A    4/1968   Conners
(Continued)

FOREIGN PATENT DOCUMENTS

CN    1057245 C    10/2000
JP    51-111125    10/1976
(Continued)

OTHER PUBLICATIONS

English translation of JP 2003-245879 to Yanagishawa. (Year: 2003).*
(Continued)

*Primary Examiner* — William C Joyce
(74) *Attorney, Agent, or Firm* — Crowell & Moring LLP

(57) ABSTRACT

A system and method for a planar positioning system for an output member, the system having a pair of x-coordinate linear carriages and a pair of y-coordinate linear carriages. The system has a guide mechanism for the pair of x-coordinate linear carriages and the pair of y-coordinate linear carriages. The system has a plurality of movement and constraining cables extending from the pair of x-coordinate linear carriages and the pair of y-coordinate linear carriages to the output member for driving the output, wherein the pair of x-coordinate linear carriages and the output member move in sync in the x-direction and the pair of y-coordinate linear carriages and the output member move in sync in the y-direction. A restraint mechanism restrains the output member in an additional degree of freedom besides the x- and y-directions. The restraint can be a cable uptake and release device.

5 Claims, 38 Drawing Sheets

Related U.S. Application Data

(60) Provisional application No. 62/005,329, filed on May 30, 2014.

(52) U.S. Cl.
CPC ....... *F16H 2019/069* (2013.01); *Y10S 901/21* (2013.01); *Y10T 74/20341* (2015.01); *Y10T 74/20354* (2015.01)

(58) Field of Classification Search
USPC ......... 74/89.22; 33/1 M; 246/139 R; 901/16; 212/312, 313
See application file for complete search history.

(56) References Cited

U.S. PATENT DOCUMENTS

| | | | |
|---|---|---|---|
| 3,422,538 | A | 1/1969 | Panissidi |
| 3,438,133 | A | 4/1969 | Brault |
| 3,930,259 | A | 12/1975 | Hoskins |
| 4,369,579 | A | 1/1983 | Mizoule |
| 4,420,886 | A | 12/1983 | Amano |
| 4,995,277 | A | 2/1991 | Yanagisawa |
| 5,311,790 | A | 5/1994 | Yanagisawa |
| 5,804,932 | A | 9/1998 | Yanagisawa |
| 8,042,452 | B2 | 10/2011 | Dujardin |
| 9,108,360 | B2 | 8/2015 | Comb |
| 10,262,549 | B2 | 4/2019 | Wame |
| 2011/0127229 | A1 | 6/2011 | Laliberte et al. |

FOREIGN PATENT DOCUMENTS

| | | | |
|---|---|---|---|
| JP | 57-156518 | | 9/1982 |
| JP | 58-59777 A | | 4/1983 |
| JP | 3-55177 A | | 3/1991 |
| JP | 5-31683 A | | 2/1993 |
| JP | 2003-245879 | * | 9/2003 |
| WO | WO 96/31324 | | 10/1996 |
| WO | WO 03/070433 A1 | | 8/2003 |

OTHER PUBLICATIONS

Liu, "Conceptual Design, Static and Dynamic Analysis of Novel Cable-Loop-Driven Parallel Mechanisms", 2012, Quebec, (195 pages).

Chinese-language Office Action issued in counterpart Chines Application No. 2015800387750 dated Apr. 28, 2018 with English translation nine (9) pages).

Extended European Search Report issued in counterpart European Application No. 15799233.0 dated Mar. 28, 2018 (seven (7) pages).

* cited by examiner

POSITIONING SYSTEM

CROSS-REFERENCE TO RELATED APPLICATIONS

This application is a continuation of U.S. application Ser. No. 14/727,851, filed Jun. 1, 2015, which claims the benefit of U.S. Patent Application 62/005,329, which was filed on May 30, 2014 and which is incorporated in its entirety herein by reference.

GOVERNMENT LICENSE RIGHTS

This invention was made with government support under N00014-11-0713 awarded by the U.S. Navy and under FA9550-09-1-0613 awarded by the U.S. Air Force. The government has certain rights in the invention.

TECHNICAL FIELD

The inventions described herein relate to systems and methods for positioning a movable member in one or more dimensions. More specifically, the inventions described herein include systems and methods for positioning a movable member constrained by flexible transmission elements.

BACKGROUND

Numerous devices, such as plotters, pick and place machines, 3D printers, and computer numerical control (CNC) machine tools, move a device such as a pen, a gripper, a laser, a filament dispenser, or a tool relative to another object. One system for controlling such movement is a Cartesian coordinate robot. Cartesian robots are one class of positioning system whose principal axes (X, Y, and Z) are linear and orthogonal. They are popular for their simplicity of control and overall performance. The most common form of a Cartesian robot is the gantry robot, which consists of two parallel guide rails oriented in a first direction of motion, and a moving crossbar, or gantry, that moves along the guide rails and itself serves as a guide rail for a moving output member in a second, perpendicular direction. It has been an aim of gantry robot design to minimize the system's moving mass by, for example, providing means to transmit motion via lightweight belts or cables from fixed actuators. In all such designs, however, the gantry has remained as a bearing structure to help constrain the degrees of freedom of the output member, adding considerable moving mass and making it difficult to apply on large scales.

Cable robots are another class of positioning system that use only cables anchored and spooled from fixed positions on an outer frame to position and constrain the degrees of freedom of a moving output member. By eliminating any sort of heavy moving structure, they can achieve large ranges of motion with high stiffness to mass ratios. Being non-Cartesian, however, precise control of the output's position is often difficult because it requires solving a complicated system of nonlinear equations based on a complex physical model to ensure proper positioning and positive cable tensions.

SUMMARY

It is recognized that there exists a need for a positioning system that combines simplicity of control with scalability.

It is an object of the present invention to provide a Cartesian positioning system that constrains the degrees of freedom of a moving output member using flexible constraint members, henceforth referred to as cables.

In one exemplary embodiment, a planar positioning system for an output member comprises a pair of x-coordinate linear carriages; a pair of y-coordinate linear carriages; a guide mechanism for the pair of x-coordinate linear carriages and the pair of y-coordinate linear carriages; a plurality of movement and constraining cables extending in tension from the pair of x-coordinate linear carriages and the pair of y-coordinate linear carriages to the output member for driving the output, wherein the pair of x-coordinate linear carriages and the output member move in sync in the x-direction and the pair of y-coordinate linear carriages and the output member move in sync in the y-direction; and a restraint mechanism for restraining the output member in an additional degree of freedom besides the x- and y-directions.

In an embodiment of a planar positioning system for an output member, the system has a pair of y-coordinate linear carriages and a pair of x-coordinate linear carriages. The system has a guide mechanism for the pair of y-coordinate linear carriages and the pair of x-coordinate linear carriages. The system has a plurality of movement and constraining cables extending from the pair of y-coordinate linear carriages and the pair of x-coordinate linear carriages to the output member for driving the output wherein the pair of x-coordinate linear carriages and the output member move in sync in the x-direction and the pair of y-coordinate linear carriages and the output member move in sync in the y-direction. A restraint mechanism restrains the output member in an additional degree freedom besides the x- and y-directions.

In an embodiment, the plurality of movement and constraining cables extend in tension from the pair of y-coordinate linear carriages and the pair of x-coordinate linear carriages to the output member for driving the output.

In an embodiment, the restraint mechanism of the planar positioning system restrains movement of the output member in at least one of the positive and negative directions of the z-plane. In an embodiment, the restraint mechanism restrains movement of the output member in the z-direction.

In an embodiment, the restraint mechanism for restraining movement of the output member in the z-direction includes a pair of cable uptake and release devices rotatably mounted to the output member for receiving a pair of movement and constraining cables. The uptake (release) rate of the first of the uptake and release devices of the first movement and constraining cable and the release (uptake) rate of the second of the uptake and release devices of the second movement and constraining cable are equivalent for limiting movement of the output member in one direction in a plane generally defined by the pair of movement and constraining cables.

In an embodiment, the restraint mechanism for restraining movement of the output member in the z-direction includes a second pair of cable uptake and release devices rotatably mounted to the output member for receiving a pair of movement and constraining cables. For each pair of uptake and release devices, the uptake (release) rate of the first of the uptake and release devices of the first movement and constraining cable and the release (uptake) rate of the second of the uptake and release devices of the second movement and constraining cable are equivalent for limiting movement of the output member in the plane generally defined by the two pair of movement and constraining cables.

In an embodiment of the planar positioning system, the collecting and dispensing rates of z-constraint cables is equal to the rate of the cables' shortening and lengthening, respectively, such that the output member is maintained in a plane of constant z-coordinate.

In an embodiment of the planar positioning system, the z-constraint device comprises a variable-radius spool having a helical groove profile whose radius as a function of the angle of rotation about its axis is defined by the equation $$\frac{ds}{d\alpha} = -\frac{dL}{d\alpha}$$

where $\alpha$ is the angle of rotation of the helix with respect to a fixed point on the helix and s is the total arc length of the helix from the fixed point, and L is the free length of the cable at the corresponding position in the spool's straight line path.

In an embodiment of the planar positioning system, the restraint mechanism restrains movement of the output member in at least one degree of rotation. In an embodiment, the restraint mechanism of the planar positioning system forms a force couple, wherein at least a pair of movement and constraining cables changes directions at at least two locations on the output member. In an embodiment, the restraint mechanism restrains movement of the output member in three degrees of rotation.

In an embodiment of the planar positioning system, the guide mechanism for the pair of y-coordinate linear carriages and the pair of x-coordinate linear carriages is a plurality of linear rails. In an embodiment, the restraint mechanism restrains movement of the output member in at least one of the positive and negative z-directions. In an embodiment, the restraint mechanism restrains movement of the output member in the z-direction.

In an embodiment, at least four of the plurality of movement and constraining cables are secured to an anchoring system for retaining the cables in tension. In an embodiment, a plurality of movement and constraining cables form a closed loop that encircles at least one anchoring position for changing directions. In an embodiment, the movement and constraining cables extend via the pair of linear carriages and the output member using a plurality of guides on the linear carriages and the output member. In an embodiment, the plurality of guides are pulleys positioned at various levels to allow the movement and the constraining cables to pass over other constraining cables without interference.

In an embodiment of the planar positioning system, the guide mechanism for the pair of y-coordinate linear carriages and the pair of x-coordinate linear carriages are a plurality of linear rails. In an embodiment, at least a pair of the movement and constraint cables are drive cables for moving the output member in an xy-plane relative to the pair of y-coordinate linear carriages and the pair of x-coordinate linear carriages.

In an embodiment of a method of positioning an output member, the output member is constrained along the y-direction using a pair of y-coordinate linear carriages. The y-coordinate linear carriages each are movable along a linear rail; the linear carriages are constrained to move in sync by at least a pair of movement and constraining cable. The output member is constrained along the x-direction using a pair of x-coordinate linear carriages. The x-coordinate linear carriages each are movable along a linear rail; the linear carriages are constrained to move in sync by at least a pair of movement and constraining cables. The output member is constrained from rotating about its Z-axis using at least one pair of linear carriages. A force couple is provided by at least a pair of movement and constraining cables changing directions at at least two locations on the output member.

In an embodiment, the output member is constrained along the xz direction using the pair of x coordinate linear carriages. A force couple is provided by at least a pair of movement and constraining cables changing directions in both the x and z directions at least two locations on the output member. The constraining the output member is constrained along the yz direction using the pair of y coordinate linear carriages. A force couple is provided by at least a pair of movement and constraining cables changing directions in both the y and z directions at least two locations on the output member.

In an embodiment of a constraining device for a positioning system, the system has a pair of cable uptake and release device rotatably mounted for receiving a pair of movement and constraining cables. The uptake (release) rate of the first of the uptake and release devices of the first movement and constraining cable and the release (uptake) rate of the second of the uptake and release devices of the second movement and constraining cable are equivalent for limiting movement of the output member in one direction in a plane defined generally by the pair of movement and constraining cables.

In an embodiment, the constraining device has a second pair of cable uptake and release devices rotatably mounted for receiving a pair of movement and constraining cables. For each pair of uptake and release devices, the uptake (release) rate of the first of the uptake and release devices of the first movement and constraining cable and the release (uptake) rate of the second of the uptake and release devices of the second movement and constraining cable are equivalent for limiting movement of the output member in the plane defined generally by the two pairs of movement and constraining cables.

In an embodiment, the output member has at least three cable uptake and release devices rotatably mounted to an output member for receiving a pair of movement and constraining cables. For each of the three uptake and release devices, the uptake (release) rate of the first of the uptake and release devices of the first movement and constraining cable and the release (uptake) rate of the second of the uptake and release devices of the second movement and constraining cable are equivalent for limiting the movement of the output member.

In an embodiment, the cable uptake and release device is rotatably mounted to the output member. In an embodiment, the cable uptake and release device is rotatably mounted to a synchronizing element.

In an embodiment of a constraining device, the constraining device has an output member containing an output point and a base plane. A pair of lengths of cable extend in different directions from the output member toward the base plane, wherein each cable is in tension. Each length of cable is partially wound on at least one spool. The maximum distance of the output point from the base plane is constrained for each position of the output point within a prescribed range of motion. The set of points of maximum distance of the output point from the base plane within the range of motion defines a locus. The rotation of each spool about its axis of rotation is a function of the position of the output point along the locus.

In an embodiment of the constraining device, the locus is a straight line. In an embodiment, the locus is a straight line parallel to the base plane.

In an embodiment, a constraining system for movement of an output member in an x-direction has a pair of anchoring ends generally located beyond the travel of the output member in the x-direction. The constraining system has a plurality of movement and constraining cables extending from each of the anchoring ends towards the output member. One of the plurality of movement and constraining cables from one of the anchoring ends and one of the plurality of movement and constraining cables from the other of the anchoring ends form a pair of plurality of movement and constraining cables. The output member has a plurality of cable uptake and release devices rotatably mounted to an output member. Each cable uptake and release device receives one of the pairs of the plurality of pair of movement and constraining cables. The uptake (release) rate of the first of the uptake and release devices of the first movement and constraining cable and the release (uptake) rate of the second of the uptake and release devices of the second movement and constraining cable are equivalent for limiting movement of the output member in at least one non-x-direction.

In an embodiment of the constraining system for movement of an output member in an direction, the output member has cable uptake and release device at at least two distinct locations along the x-direction.

In an embodiment of the constraining system for movement of an output member in an x-direction, the pair of anchoring systems each have at least three anchoring positions. The plurality of movement and constraining cables extending from each of the anchoring ends towards the output member includes at least three pairs of movement and constraining cables. The output member has at least three plurality of cable uptake and release devices rotatably mounted to the output member in a yz-plane.

In an embodiment of the constraining system for movement of an output member in an x-direction, the pair of anchoring systems each have at least three anchoring positions. The plurality of movement and constraining cables extending from each of the anchoring ends towards the output member includes at least four pairs of movement and constraining cables. The output member has at least four plurality of cable uptake and release devices rotatably mounted to the output member in a yz-plane.

A constraining system for movement of an output member in an x-direction, wherein the constraining system includes the output member having cable uptake and release devices at at least two distinct locations along the x-direction.

In a variation of the embodiment above, the restraint mechanism prevents movement in the z-direction. In another variation, the restraint mechanism prevents movement in the z-direction to a particular point. For example, the restraint could impose a floor or ceiling position where the output member can travel up to and not beyond the floor or ceiling position.

In some embodiments utilizing a spool, the positioning system can utilize 1, 2, 3, 4 or more spools to constrain the output member in the z-direction and in some instances to constrain the output member's rotational degrees of freedom.

In some embodiments, a constraining device used in conjunction with positioning systems can comprise an output member containing an output point; a base plane; a pair of lengths of cable extending in different directions from the output member toward the base plane, wherein each cable is in tension, wherein each length of cable is partially wound on one or more spools, wherein, for each position of the output point within a prescribed range of motion, the maximum distance of the output point from the base plane is constrained, wherein the set of points of maximum distance of the output point from the base plane within the range of motion defines a locus, wherein the rotation of each spool about its axis of rotation is a function of the position of the output point along the locus.

It is to be understood that the features of the various embodiments described herein are not mutually exclusive and can exist in various combinations and permutations.

BRIEF DESCRIPTION OF THE SEVERAL VIEWS OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Several embodiments of a positioning system having an output member that is constrained by cables and other restraint mechanisms are described in detail below.

These exemplary embodiments are described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment can be combined with the features of other embodiments. Such modifications and variations are intended to be included within the scope of the present invention.

Figure 1:
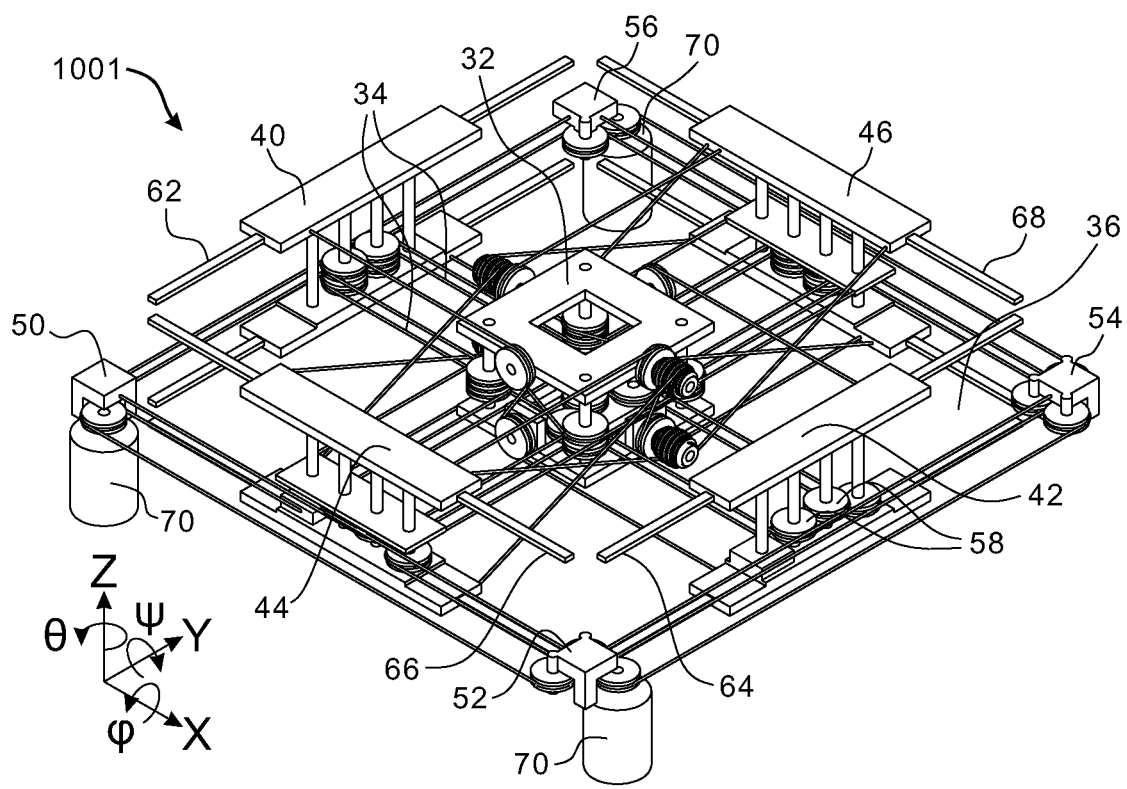
FIG. 1 is a perspective view of an embodiment of a positioning system.

Referring to FIG. 1, a perspective view of a positioning system 1001 is shown. The positioning system has an output member 32 that is constrained to move in the xy-plane within a workspace 36, as described. The output member 32 of the positioning system 1001 is constrained by a plurality of movement and constraining cables 34. These cables can also take the form of belts, chains, or other varieties of flexible transmission elements. Only the movement and constraining cables 34 interact directly with the output member 32. The positioning system 1001 has a pair of y-coordinate linear carriages 40 and 42 that are constrained to move only in the y-direction. The positioning system 1001 has a pair of x-coordinate linear carriages 44 and 46 that are constrained to move only in the x-direction. The x-coordinate linear carriages 44 and 46 are free to slide on a pair of x-parallel linear guides 66 and 68, respectively. The y-coordinate linear carriages 40 and 42 are free to slide on a pair of y-parallel linear guides 62 and 64, respectively. The linear guides are shown as linear rails, but that is not intended to be limiting.

The positioning system 1001 has a plurality of guide and change of direction devices 58 for guiding and re-directing the movement and constraining cables 34. In one embodiment the plurality of guide and change of direction devices 58 are pulleys.

The positioning system 1001 can have a plurality of anchoring positions 50, 52, 54, and 56 that secure the movement and constraining cables 34 and to which pulleys can be fixed. Anchoring positions 50, 52, 54, and 56, and linear guides 62, 64, 66, and 68 are all fixed to a frame, which, for clarity, is not shown.

It is recognized that the coordinate system adopted in this application is for the purpose of discussion and that reference here to a particular coordinate direction could correspond to a different coordinate direction in a specific context. It is also recognized that the workspace 36 of the positioning system can be rectangular, and not merely square as illustrated in the accompanying drawings.

Figure 2:
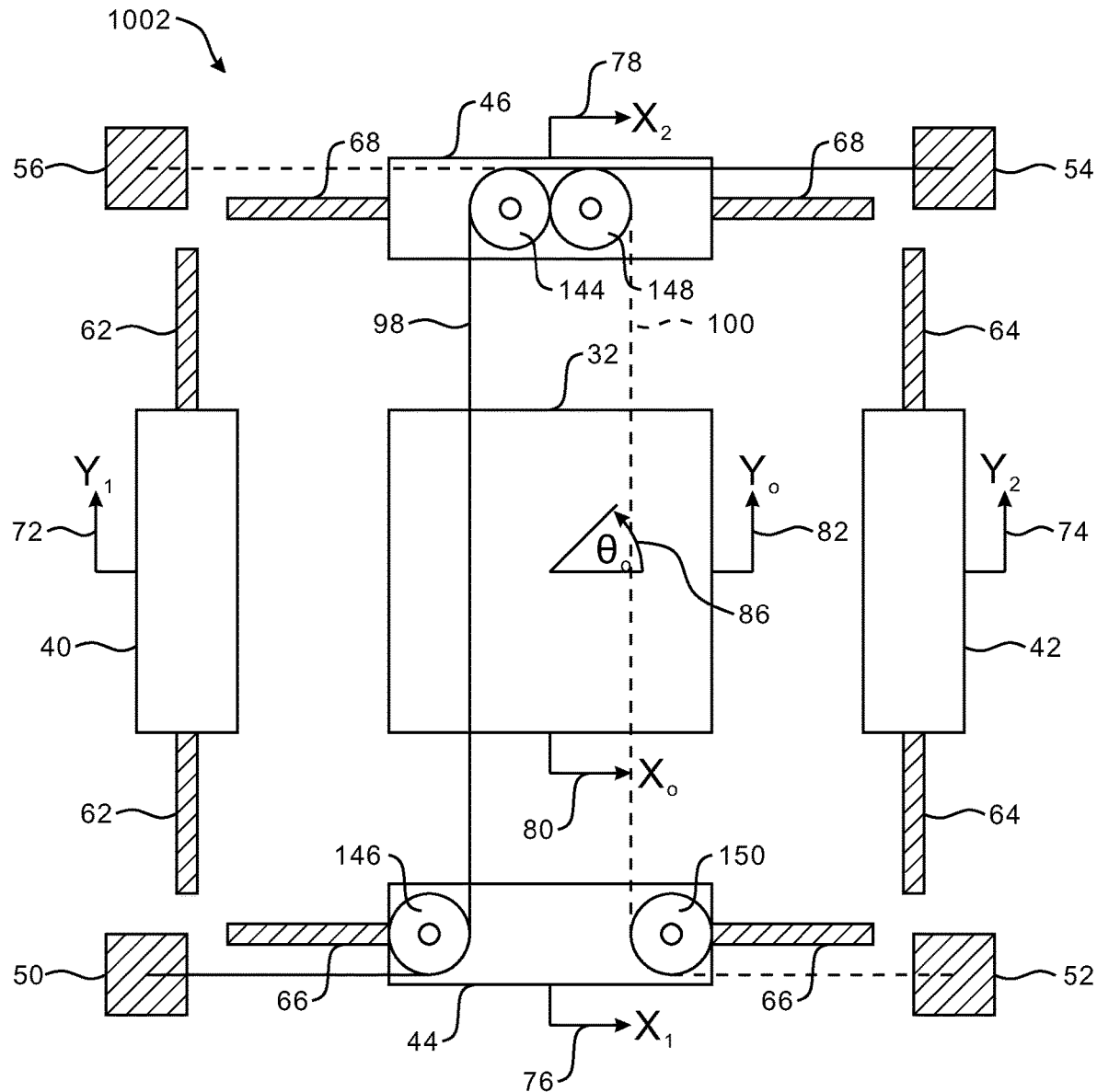
FIG. 2 is a top view schematic of a positioning system with an x-coordinate linear carriage cable constraint.

Referring to FIG. 2, a top view schematic of a positioning system 1002 is shown, where the movement and constraining cables 34 include a pair of x-constraint cables 98 and 100 that constrain motion of the x-coordinate linear carriages 44 and 46 to be the same. The positions of x-coordinate linear carriages 44 and 46 are measured by a pair of x-parallel coordinates 76 and 78, referred to as $x_1$ and $x_2$. The positions of y-coordinate linear carriages 40 and 42 are measured by a pair of y-parallel coordinates 72 and 74, referred to as $y_1$ and $y_2$.

In the plane of FIG. 2, the xy-plane, the output member 32 has two translational degrees of freedom (DOFs) corresponding to coordinates 80 and 82, referred to as $x_o$ and $y_o$ respectively, for the purpose of discussion, and one rotational DOF corresponding to coordinate 86, referred to as $\theta_o$.

Not shown in FIG. 2, output member 32 also has one translational DOF perpendicular to the plane and two rotational DOFs about the x- and y-axes.

Referring to FIG. 2, the x-constraint cable 98 extends from and is anchored to the anchoring position 54, wraps around a pulley 144, which is mounted on the x-coordinate linear carriage 46, and wraps around a pulley 146, which is mounted on the x-coordinate linear carriage 44, and is anchored to the anchoring position 50. To balance the forces from the x-constraint cable 98 on the x-coordinate linear carriages 44 and 46, the second x-constraint cable 100, which is shown as a broken line, extends from and is anchored to anchoring position 56, wraps around a pulley 148, which is mounted on the x-coordinate linear carriage 46, wraps around a pulley 150, which is mounted on the x-coordinate linear carriage 44, and is anchored to the anchoring position 52. The cables 98 and 100 thus form a symmetrical arrangement and the system is in equilibrium with equal tensions in the two cables, neglecting external forces.

Note that henceforth it can be assumed that proper means are provided for ensuring sufficient cable tension, including but not limited to, tensioners at an anchoring position or tensioners along the length of a cable. It can also be assumed, for the purpose of discussion, that the cables are inextensible, that is, they do not stretch and they have a constant length.

Based on the constant lengths of the cables, for cable 98, the equation $$x_1 + L_y + L_x - x_2 = \text{constant} \tag{1}$$

applies, where $L_y$ is the length of the workspace area 36 in the y-direction and $L_x$ is the length of the workspace area 36 in the x-direction. If $x_1$ changes by an amount $\Delta x_1$, such that the new position of linear carriage 44 is $(x_1 + \Delta x_1)$, and $x_2$ changes by an amount $\Delta x_2$, such that the new position of linear carriage 44 is $(x_2 + \Delta x_2)$, then, based on Equation (1), the equation $$x_1 + L_y + L_x - x_2 = (x_1 + \Delta x_1) + L_y + L_x - (x_2 + \Delta x_2) \tag{2}$$

applies, which can be solved to show that $\Delta x_1 = \Delta x_2$. The same analysis can be performed for cable 100 with the same result. Thus, the cable constraint of FIG. 2 constrains the displacements of the x-coordinate linear carriages 44 and 46 to be equal, and thus constrains motion of the x-coordinate linear carriages 44 and 46 to be the same.

Figure 3:
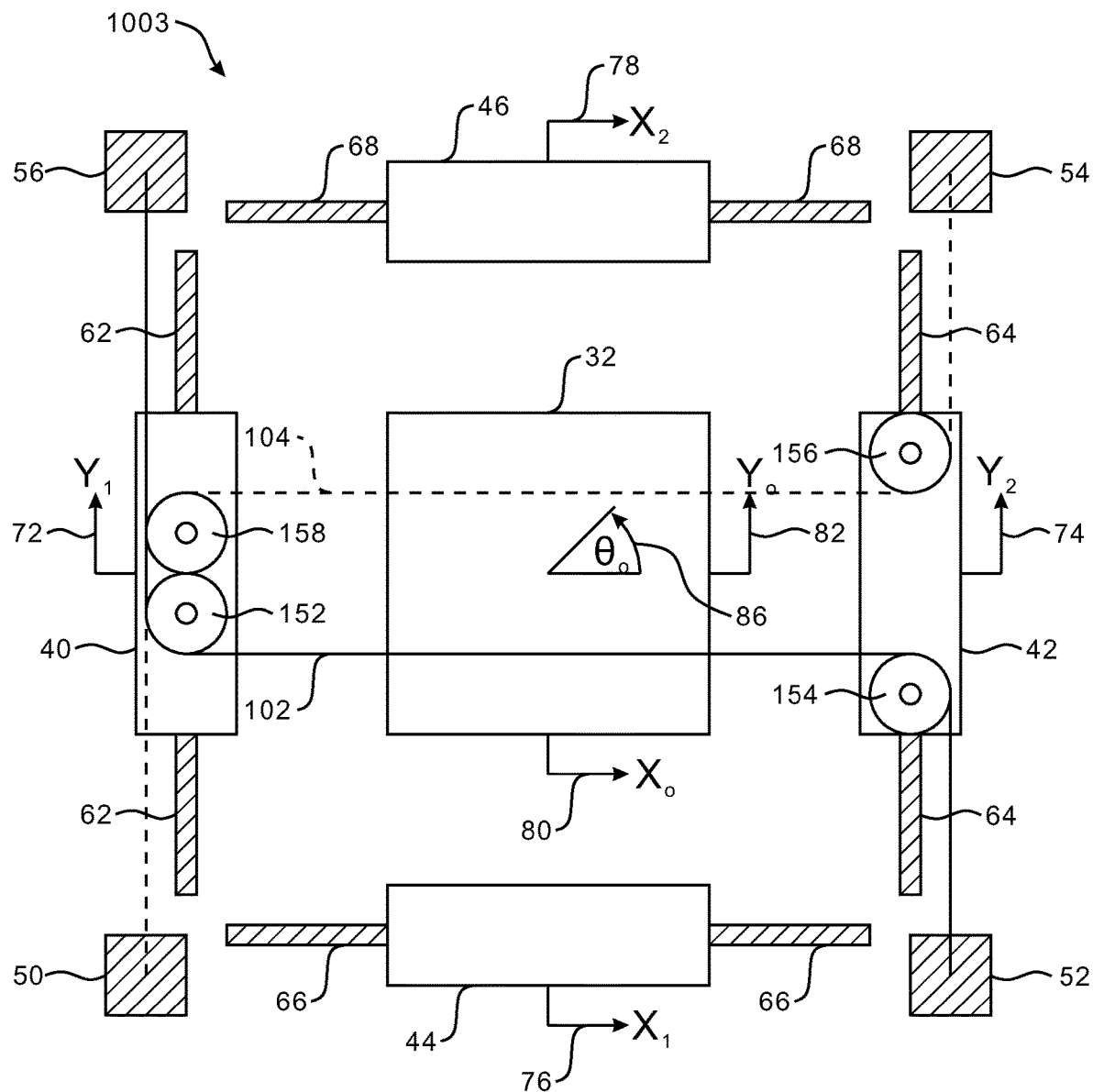
FIG. 3 is a top view schematic of a positioning system with a y-coordinate linear carriage cable constraint.

Referring to FIG. 3, a top view schematic of a positioning system 1003 is shown, where the movement and constraining cables 34 include a pair of y-constraint cables 102 and 104 that constrain motion of the y-coordinate linear carriages 40 and 42 to be the same.

Referring to FIG. 3, the y-constraint cable 102 extends from and is anchored to the anchoring position 56, wraps around a pulley 152, which is mounted on the y-coordinate linear carriage 40, and wraps around a pulley 154, which is mounted on the y-coordinate linear carriage 42, and is anchored to the anchoring position 52. To balance the forces from the y-constraint cable 102 on the y-coordinate linear carriages 40 and 42, the second y-constraint cable 104, which is shown as a broken line, extends from and is anchored to anchoring position 54, wraps around a pulley 156, which is mounted on the y-coordinate linear carriage 42, wraps around a pulley 158, which is mounted on the y-coordinate linear carriage 40, and is anchored to the anchoring position 50. The cables 102 and 104 thus form a symmetrical arrangement and the system is in equilibrium with equal tensions in the two cables, neglecting external forces.

Based on the constant lengths of the cables, for y-constraint cable 102, the equation $$L_y - y_1 + L_x + y_2 = \text{constant} \tag{3}$$

applies. If $y_1$ changes by an amount $\Delta y_1$, such that the new position of linear carriage 40 is $(y_1 + \Delta y_1)$, and $y_2$ changes by an amount $\Delta y_2$, such that the new position of linear carriage 42 is $(y_2 \Delta y_2)$, then, based on Equation (3), the equation $$L_y - y_1 + L_x + y_2 = L_y - (y_1 + \Delta y_1) + L_x + (y_2 + \Delta y_2) \tag{4}$$

applies, which can be solved to show that $\Delta y_1 = \Delta y_2$. The same analysis can be performed for y-constraint cable 104 with the same result. Thus, the cable constraint of FIG. 3 constrains the displacements of the y-coordinate linear carriages 40 and 42 to be equal, and thus constrains motion of the y-coordinate linear carriages 40 and 42 to be the same.

Figure 4:
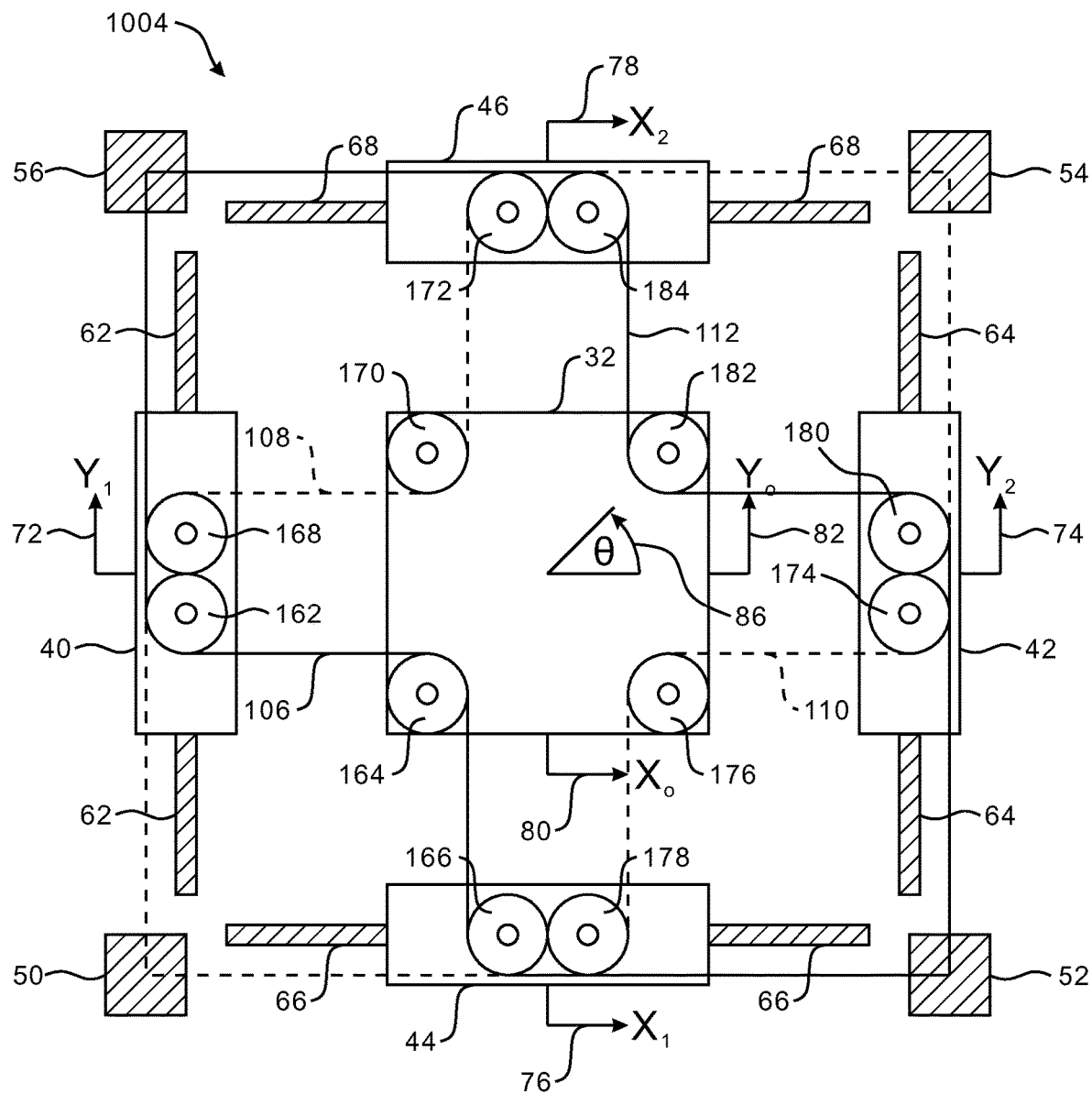
FIG. 4 is a top view schematic of a positioning system with a cable constraint for coupling an output member to a set of x- and y-coordinate linear carriages.

Referring to FIG. 4, a top view schematic of a positioning system 1004 is shown, where the movement and constraining cables 34 include four xy-constraint cables 106, 108, 110, and 112. The constraint cables constrain the displacement of the output member 32 in its x-DOF 80 to be equal to the average of the displacements of x-coordinate linear carriages 44 and 46. The constraint cables also constrain the displacement of output member 32 in its y-DOF 82 to be equal to the average of the displacements of y-coordinate linear carriages 40 and 42.

Referring to FIG. 4, the xy-constraint cable 106 extends from and is anchored to the anchoring position 56, wraps around a pulley 162, which is mounted on the y-coordinate linear carriage 40, wraps around a pulley 164, which is mounted on the output member 32, wraps around a pulley 166, which is mounted on the x-coordinate linear carriage 44, and is anchored to the anchoring position 52. The system 1004 has three more constraints like that of cable 106 to create a balanced set of constraints. The xy-constraint cable 108, shown as a broken line, extends from and is anchored to the anchoring position 50, wraps around a pulley 168, which is mounted on the y-coordinate linear carriage 40, wraps around a pulley 170, which is mounted on the output member 32, wraps around a pulley 172, which is mounted on the x-coordinate linear carriage 46, and is anchored to the anchoring position 54. The xy-constraint cable 110, shown as a broken line, extends from and is anchored to the anchoring position 54, wraps around a pulley 174, which is mounted on the y-coordinate linear carriage 42, wraps around a pulley 176, which is mounted on the output member 32, wraps around a pulley 178, which is mounted on the x-coordinate linear carriage 44, and is anchored to the anchoring positioning 50. The xy-constraint cable 112 extends from and is anchored to the anchoring position 52, wraps around a pulley 180, which is mounted on y-coordinate linear carriage 42, wraps around a pulley 182, which is mounted on the output member 32, wraps around a pulley 184, which is mounted on the x-coordinate linear carriage 46, and is anchored to the anchoring position 56. The xy-constraint cables 106, 108, 110, and 112 thus form a symmetrical arrangement and the system 1004 is in equilibrium with equal tensions in the four cables 106, 108, 110, and 112, neglecting external forces.

Based on the constant lengths of the cables 106, 108, 110, and 112, for xy-constraint cable 106, the equation $$L_y - y_1 + x_o + y_o + L_x - x_1 = \text{constant} \tag{5}$$

applies. Similarly, for xy-constraint cable 108, the equation $$y_1+x_o+L_y-y_o+L_x-x_2=\text{constant} \quad (6)$$

applies. Adding Equations (5) and (6) yields the equation $$2x_o+2L_y+2L_x-x_1-x_2=\text{constant.} \quad (7)$$

If $x_1$ changes by an amount $\Delta x_1$, such that the new position of x-coordinate linear carriage 44 is $(x_1+\Delta x_1)$, and $x_2$ changes by an amount $\Delta x_2$, such that the new position of x-coordinate linear carriage 46 is $(x_2+\Delta x_2)$, and $x_o$ changes by an amount $\Delta x_o$, such that the new x-coordinate position of output member 32 is $(x_o+\Delta x_o)$, then, based on equation (7), the equation $$2x_o+2L_y+2L_x-x_1-x_2=2(x_o+\Delta x_o)+2L_y+2L_x-(x_1+\Delta x_1)-\\ (x_2+\Delta x_2) \quad (8)$$

applies, which can be solved to show that $$\Delta x_o = \frac{\Delta x_1 + \Delta x_2}{2}.$$

Likewise, for xy-constraint cable 110, the equation $$x_1+y_o+L_x-x_o+L_y-y_2=\text{constant} \quad (9)$$

applies. Adding Equations (5) and (9) yields the equation $$2L_y-y_1+2y_o+2L_x-y_2=\text{constant.} \quad (10)$$

If $y_1$ changes by an amount $\Delta y_1$, such that the new position of y-coordinate linear carriage 40 is $(y_1+\Delta y_1)$, and $y_2$ changes by, an amount $\Delta y_2$, such that the new position of y-coordinate linear carriage 42 is $(y_2+\Delta y_2)$, and $y_o$ changes by an amount $\Delta y_o$, such that the new y-coordinate position of output member 32 is $(y_o+\Delta y_o)$, then, based on equation (10), the equation $$2L_y-y_1+2y_o+2L_x-y_2=2L_y-(y_1+\Delta y_1)+2(y_o+\Delta y_o)+2L_x-\\ (y_2+\Delta y_2) \quad (11)$$

applies, which can be solved to show that $$\Delta y_o = \frac{\Delta y_1 + \Delta y_2}{2}.$$

Figure 5:
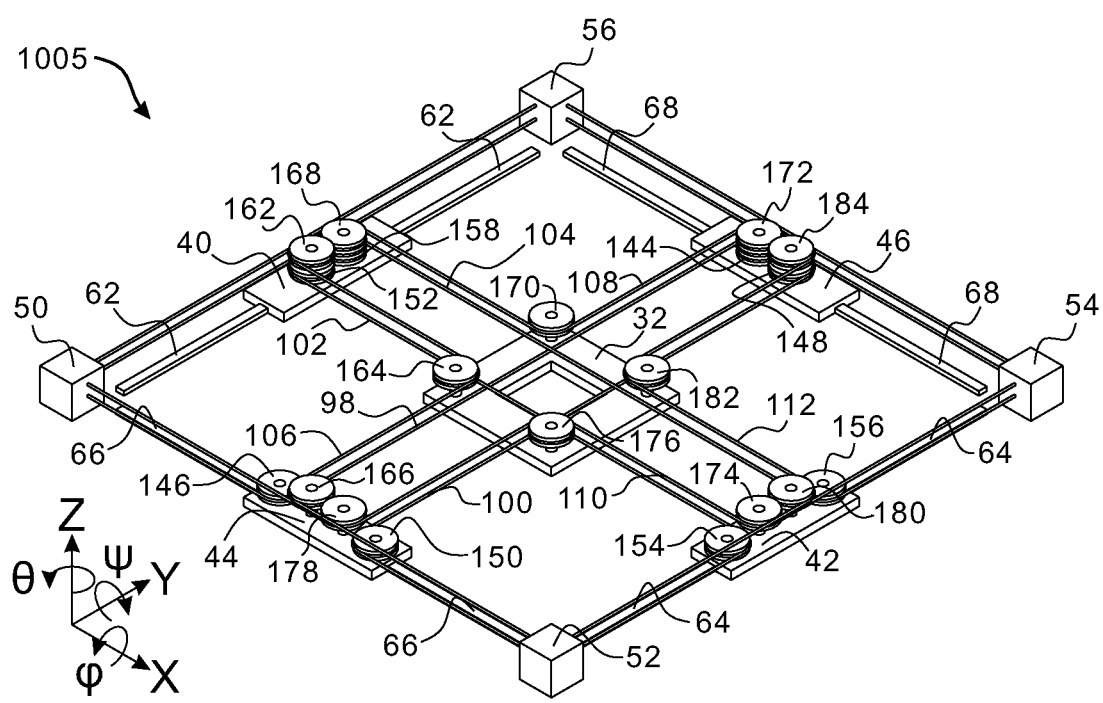
FIG. 5 is a perspective view of a positioning system with cable constraints for moving an output member in sync with a set of x- and y-coordinate linear carriages.

Referring to FIG. 5, a perspective view of a positioning system 1005 is shown, where the movement and constraining cables 34 include all three of the cable constraints from FIG. 2, FIG. 3, and FIG. 4. This results in a constraint that $\Delta x_o=\Delta x_1=\Delta x_2$ and $\Delta y_o=\Delta y_1=\Delta y_2$. Thus, the combination of the three constraints constrains the output member 32 and the two x-coordinate linear carriages 44 and 46 to move in sync with each other in the x-direction and constrains the output member 32 and the two y-coordinate linear carriages 40 and 42 to move in sync with each other in the y-direction.

Referring to FIG. 5, the pulleys 144, 146, 148, 150, 152, 154, 156, and 158 and the constraining cables 98, 100, 102, and 104 form a first layer of constraints, described in more detail in reference to FIG. 2 and FIG. 3, for constraining the x-coordinate linear carriages 44 and 46 to move in sync with each other in the x-direction, and for constraining the v-coordinate linear carriages 40 and 42 to move in sync with each other in the y-direction. The pulleys 162, 164, 166, 168, 170, 172, 174, 176, 178, 180, 182, and 184, and the constraining cables 106, 108, 110, and 112 form a second layer of constraints, described in more detail in reference to FIG. 4, for constraining the output member 32 to move in sync with the midpoint of the x-coordinate linear carriages 44 and 46 in the x-direction and for constraining the output member 32 to move in sync with the midpoint of the y-coordinate linear carriages 40 and 42 in the y-direction. The anchoring positions 50, 52, 54, and 56 provide connection of the constraining cables to a rigid frame, which for clarity is not shown, for transferring of constraint and pre-tensioning forces to the frame. The linear guide rails 62, 64, 66, and 68 connect the linear carriages 40, 42, 44, and 46 to the frame for resisting the forces on the linear carriages from the pre-tensioning of the constraining cables 34.

It is noted that, although the combination of constraints of FIG. 5, or any similar combination, constitutes a minimal set of constraints for controlling the x- and y-coordinates of the center of motion of output member 32, in general they will not be sufficient for controlling the x- and y-coordinates of an output device mounted to output member 32. Because they will be susceptible to rotation of output member 32 about its X- and Y-axes, in general, a sine error in the displacement of the output device will be incurred. Furthermore, the combination of constraints of FIG. 5, or any similar combination, will not be able to resist any torque about the Z-axis of output member 32, which would be of critical importance for various kinds of CNC machine tools, for example. Furthermore, the combination of constraints of FIG. 5, or any similar constraints, would not be able to resist any forces in the Z-direction of output member 32, which would be important for any device requiring precise three-dimensional positioning, such as a 3D printer. Therefore, is it an object of this invention to provide additional constraints on output member 32 that constrain its remaining degrees of freedom and that enable its use in a variety of practical applications.

To constrain one or more rotational degrees of freedom of the output member 32 while leaving it free to translate in the x- and y-directions, one or more constraints can be used that impose a rolling force couple on the output member 32.

Figure 6:
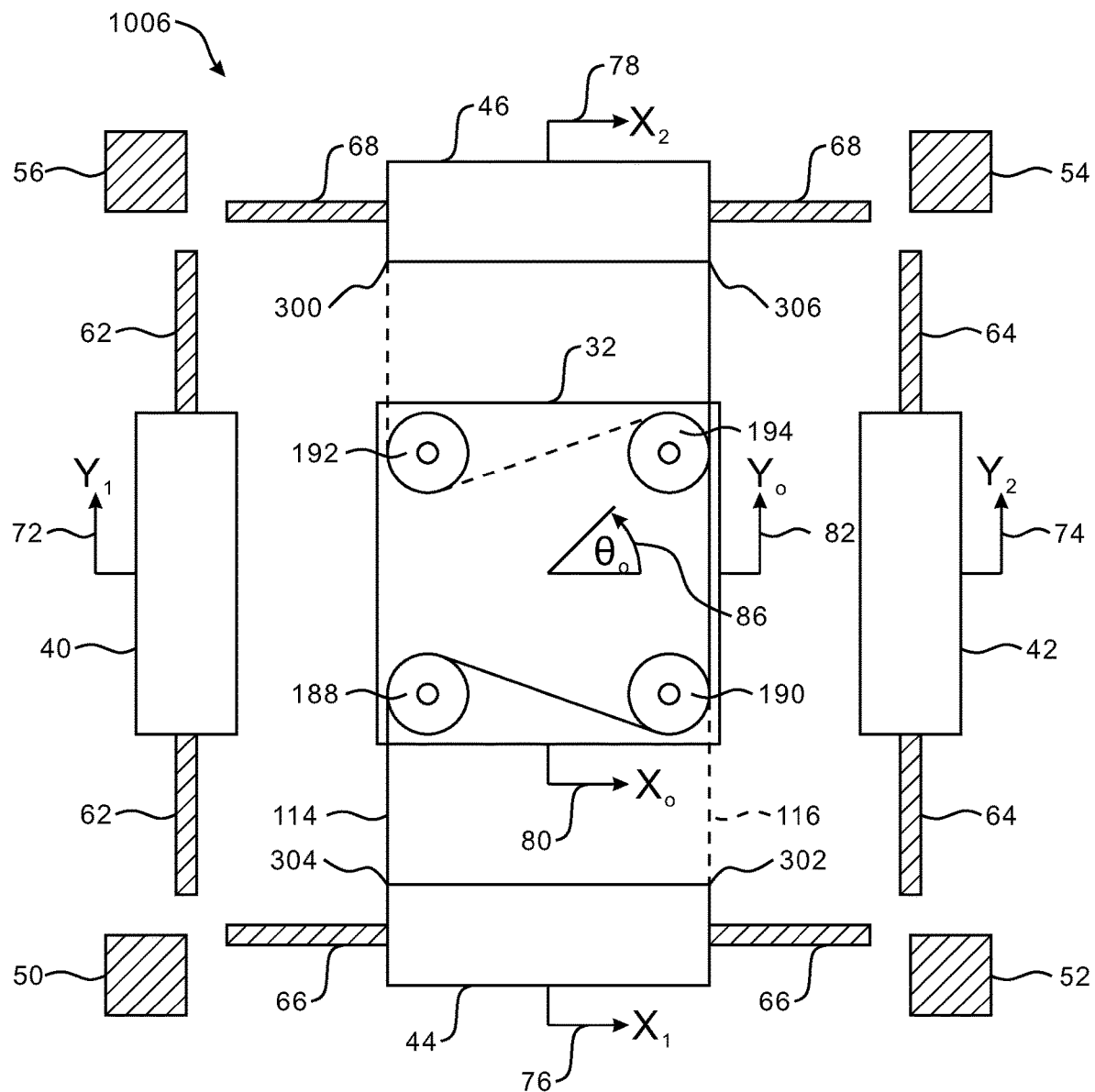
FIG. 6 is a top view schematic of a positioning system with a cable constraint for preventing rotation of an output member about its Z-axis.

Referring to FIG. 6, a top view schematic of a positioning system 1006 is shown, where the movement and constraining cables 34 include a pair of θ-constraint cables 114 and 116 that constrain the output member 32 from rotating about its Z-axis.

Referring to FIG. 6, the θ-constraint cable 114 extends from and is anchored to the anchoring point 304 on x-coordinate linear carriage 44, wraps around a pulley 188, which is mounted on the output member 32, wraps around a pulley 190, which is mounted on the output member 32, and is anchored to the anchoring point 306 on x-coordinate linear carriage 46. To balance the moment from the θ-constraint cable 114 on the output member 32, the second θ-constraint cable 116, which is shown as a broken line, extends from and is anchored to anchoring point 302 on x-coordinate linear carriage 44, wraps around a pulley 194, which is mounted on the output member 32, wraps around a pulley 192, which is mounted on the output member 32, and is anchored to the anchoring point 300 on x-coordinate linear carriage 46. The cables 114 and 116 thus form a symmetrical arrangement and the system is in equilibrium with equal tensions in the two cables, neglecting external forces.

Based on the constant lengths of the cables, for θ-constraint cable 114, the equation $$y_o-\theta_o d+2d+L_y-y_o-\theta_o d=-2\theta_o d+2d+L_y=\text{constant} \quad (12)$$

applies as a first-order approximation, where d is half of the distance between adjacent pulleys' centers on output member 32. If $\theta_o$ changes by an amount $\Delta\theta_o$, such that the new orientation of output member 32 is $(\theta_o+\Delta\theta_o)$, then, based on equation (12), the equation $$-2\theta_o d+2d+L_y=-2(\theta_o+\Delta\theta_o)d+2d+L_y \quad (13)$$

applies, which can be solved to show that $\Delta\theta_o=0$. The same analysis can be performed for $\theta$-constraint cable 116 with the same result. Thus, the cable constraint of FIG. 6 constrains the output member 32 from rotating about its Z-axis. The cable constraint also leaves the output member 32 free to translate because the pulleys can roll along the cable without changing its length.

Figure 7:
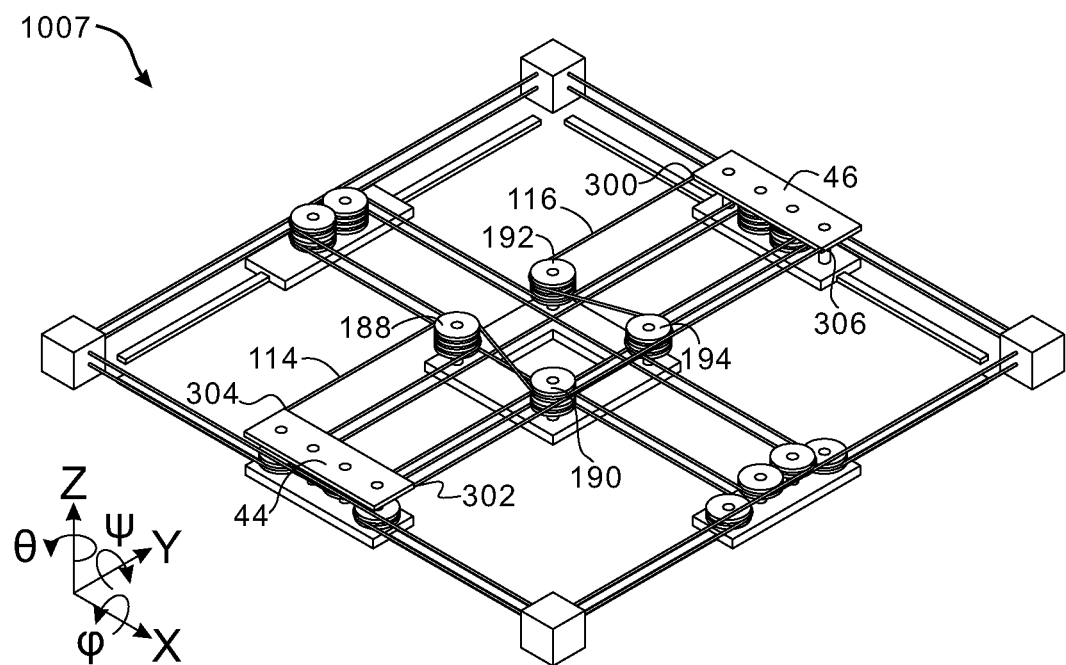
FIG. 7 is a perspective view of a positioning system with cable constraints for moving an output member in sync with a set of x- and y-coordinate linear carriages and preventing rotation about its Z-axis.

Referring to FIG. 7, a perspective view of a positioning system 1007 is shown, where the movement and constraining cables 34 include all four of the cable constraints from FIG. 2, FIG. 3, FIG. 4, and FIG. 6. This results in a constraint that $\Delta x_o=\Delta x_1=\Delta x_2$, $\Delta y_o=\Delta y_1=\Delta y_2$, and $\Delta\theta_o=0$. Thus, the combination of the four constraints constrains the output member 32 and the two x-coordinate linear carriages 44 and 46 to move in sync with each other in the x-direction and constrains the output member 32 and the two y-coordinate linear carriages 40 and 42 to move in sync with each other in the y-direction and constrains the output member 32 from rotating about its Z-axis.

Referring to FIG. 7, the first set of three constraints is described in more detail in the description of FIGS. 2-5. The pulleys 188, 190, 192, and 194 and the constraining cables 114 and 116 form a fourth constraint, described in more detail reference to FIG. 6, for constraining the output member from rotating about its Z-axis. The anchoring points 300, 302, 304, and 306 provide connection of the constraining cables to the x-coordinate linear carriages 44 and 46. The other features in FIG. 7 are discussed in reference to FIG. 5.

It is recognized that, although the constraint on $\theta$ has been shown between the output member 32 and the x-coordinate linear carriages 44 and 46, it could also be between the output member 32 and the y-coordinate linear carriages 40 and 42.

Figure 8:
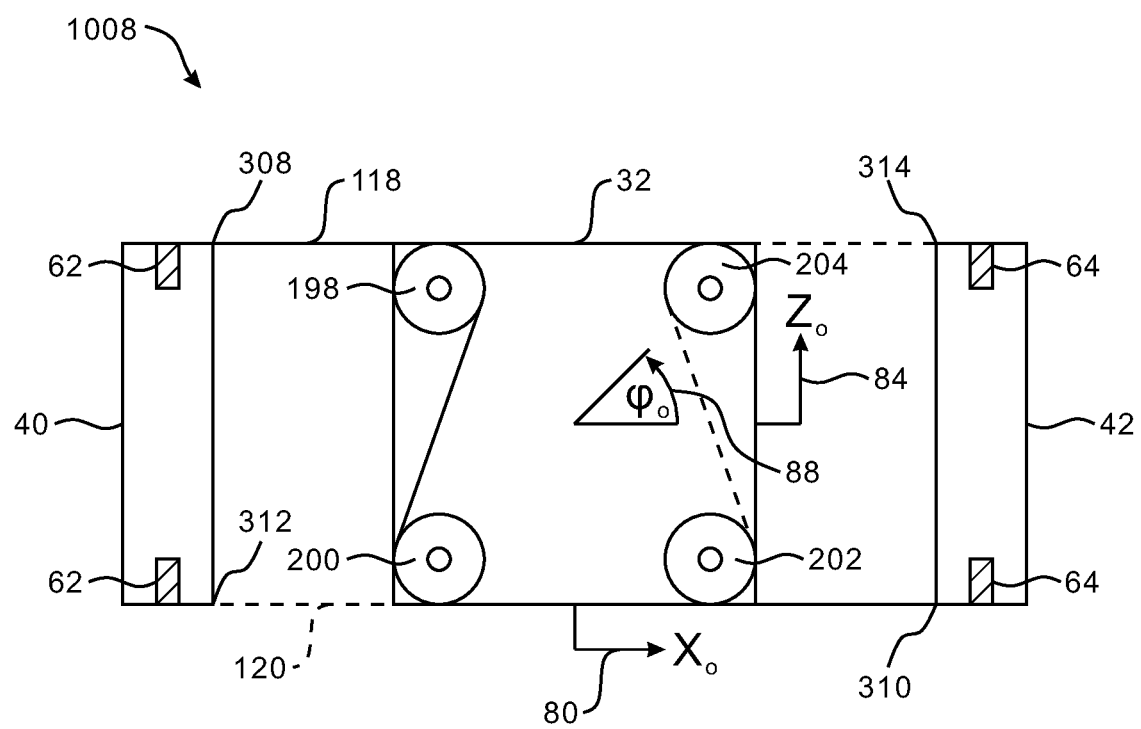
FIG. 8 is a front view schematic of a positioning system with a cable constraint for preventing rotation of an output member about its Y-axis.

Referring to FIG. 8, a front view schematic of a positioning system 1008 is shown, where the movement and constraining cables 34 include a pair of $\varphi$-constraint cables 118 and 120 that constrain the output member 32 from rotating about its Y-axis. It is noted that the x-coordinate linear carriages 44 and 46 and the x-direction linear guides 66 and 68 have not been shown, for the purpose of clarity.

Referring to FIG. 8, the $\varphi$-constraint cable 118 extends from and is anchored to the anchoring point 308 near the top of y-coordinate linear carriage 40, wraps around a pulley 198, which is mounted on the output member 32, and wraps around a pulley 200, which is mounted on the output member 32, and is anchored to the anchoring point 310 near the bottom of y-coordinate linear carriage 42. To balance the moment from the $\varphi$-constraint cable 118 on the output member 32, the second $\varphi$-constraint cable 120, which is shown as a broken line, extends from and is anchored to anchoring point 312 near the bottom of y-coordinate linear carriage 40, wraps around a pulley 202, which is mounted on the output member 32, wraps around a pulley 204, which is mounted on the output member 32, and is anchored to the anchoring point 314 near the top of y-coordinate linear carriage 42. The cables 118 and 120 thus form a symmetrical arrangement and the system is in equilibrium with equal tensions in the two cables, neglecting external forces.

Based on the constant lengths of the cables, for $\varphi$-constraint cable 114, the equation $$x_o-\phi_o d+2d+L_x-x_o-\phi_o d=-2\phi_o d+2d+L_x=\text{constant} \quad (14)$$

applies as a first-order approximation, where d is half of the distance between adjacent pulleys' centers on output member 32. If $\varphi_o$ changes by an amount $\Delta\varphi_o$, such that the new orientation of output member 32 is $(\varphi_o+\Delta\varphi_o)$, then, based on equation (14), the equation $$-2\phi_o d+2d+L_x=-2(\phi_o+\Delta\phi_o)d+2d+L_x \quad (15)$$

applies, which can be solved to show that $\Delta\phi_o=0$. The same analysis can be performed for $\varphi$-constraint cable 120 with the same result. Thus, the cable constraint of FIG. 8 constrains the output member from rotating about its Y-axis. The cable constraint also leaves the output member 32 free to translate because the pulleys can roll along the cable without changing its length.

Figure 9:
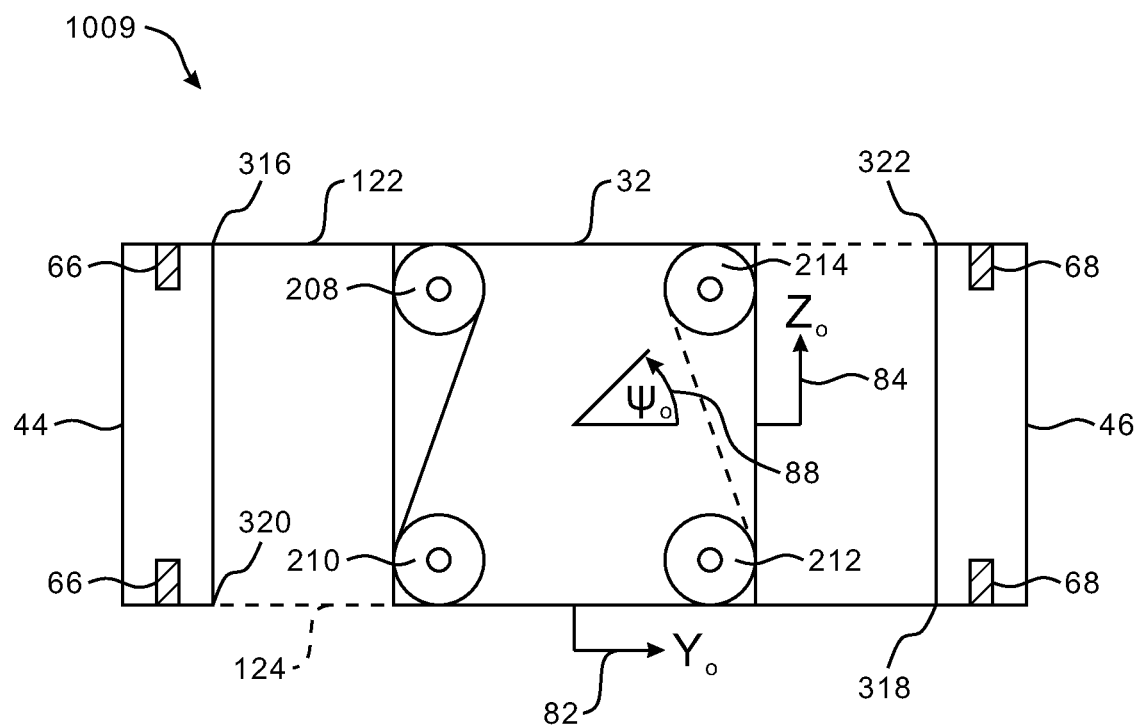
FIG. 9 is a right view schematic of a positioning system with a cable constraint for preventing rotation of an output member about its X-axis.

Referring to FIG. 9, a right view schematic of a positioning system 1009 is shown, where the movement and constraining cables 34 include a pair of $\psi$-constraint cables 122 and 124 that constrain the output member 32 from rotating about its X-axis. It is noted that the y-coordinate linear carriages 40 and 42 and the y-direction linear guides 62 and 64 have not been shown, for the purpose of clarity.

Referring to FIG. 9, the $\psi$-constraint cable 122 extends from and is anchored to the anchoring point 316 near the top of x-coordinate linear carriage 44, wraps around a pulley 208, which is mounted on the output member 32, and wraps around a pulley 210, which is mounted on the output member 32, and is anchored to the anchoring point 318 near the bottom of x-coordinate linear carriage 46. To balance the moment from the $\psi$-constraint cable 122 on the output member 32, the second $\psi$-constraint cable 124, which is shown as a broken line, extends from and is anchored to anchoring point 320 near the bottom of x-coordinate linear carriage 44, wraps around a pulley 212, which is mounted on the output member 32, wraps around a pulley 214, which is mounted on the output member 32, and is anchored to the anchoring point 322 on x-coordinate linear carriage 46. The cables 122 and 124 thus form a symmetrical arrangement and the system is in equilibrium with equal tensions in the two cables, neglecting external forces.

Based on the constant lengths of the cables, for $\psi$-constraint cable 122, the equation $$y_o-\psi_o d+2d+L_y-y_o-\psi_o d=-2\psi_o d+2d+L_y=\text{constant} \quad (16)$$

applies as a first-order approximation, where d is half of the distance between adjacent pulleys' centers on output member 32. If $\psi_o$ changes by an amount $\Delta\psi_o$, such that the new orientation of output member 32 is $(\psi_o+\Delta\psi_o)$, then, based on equation (16), the equation $$-2\psi_o d+2d+L_y=-2(\psi_o+\Delta\psi_o)d+2d+L_y \quad (17)$$

applies, which can be solved to show that $\Delta\psi_o=0$. The same analysis can be performed for $\psi$-constraint cable 124 with the same result. Thus, the cable constraint of FIG. 9 constrains the output member from rotating about its X-axis. The cable constraint also leaves the output member 32 free to translate because the pulleys can roll along the cable without changing its length.

Figure 10:
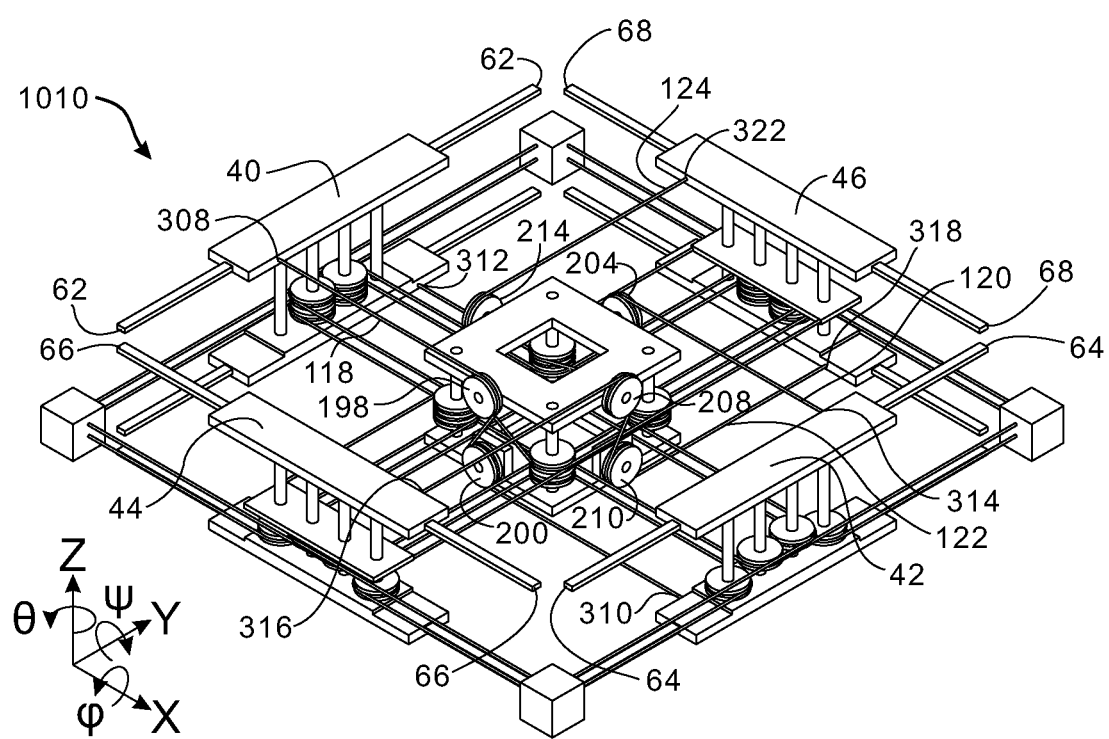
FIG. 10 is a perspective view of a positioning system with cable constraints for moving an output member in sync with a set of x- and y-coordinate linear carriages and preventing rotation about its X-, Y-, and Z-axes.

Referring to FIG. 10, a perspective view of a positioning system 1010 is shown, where the movement and constraining cables 34 include all six of the cable constraints from FIG. 2, FIG. 3, FIG. 4, FIG. 6, FIG. 8, and FIG. 9. The combination of constraints results in a constraint that $\Delta x_o\Delta x_1=\Delta x_2$, $\Delta y_o=\Delta y_1=\Delta y_2$, $\Delta\theta_o=0$, $\Delta\phi_o=0$, and $\Delta\psi_o=0$. Thus, the combination of the six constraints constrains the output member 32 and the two x-coordinate linear carriages 44 and 46 to move in sync with each other in the x-direction and constrains the output member 32 and the two y-coordinate linear carriages 44 and 46 to move in sync with each other in the y-direction and constrains the output member 32 from rotating about its Z-axis, its Y-axis, and its X-axis.

Referring to FIG. 10, the first set of four constraints is described in more detail in reference to FIGS. 2-7. The pulleys 198, 200, 202 (not visible), and 204 and the constraining cables 118 and 120 form a fifth constraint, described in more detail in reference to FIG. 8, for constraining the output member from rotating about its Y-axis. The anchoring points 308, 310, 312, and 314 provide connection of the constraining cables to the y-coordinate linear carriages 40 and 42. The pulleys 208, 210, 212 (not visible), and 214 and the constraining cables 122 and 124 form a sixth constraint, described in more detail in reference to FIG. 9, for constraining the output member from rotating about its X-axis. The anchoring points 316, 318, 320 (not visible), and 322 provide connection of the constraining cables to the x-coordinate linear carriages 44 and 46. The other features in FIG. 10 are discussed in reference to FIG. 5 and FIG. 7.

In many positioning system applications, a means of controlling the position of the output member using actuators is desired. A number of driving cable constraints are possible, including those that modify the x- and y-coordinate linear carriage constraints of FIG. 2 and FIG. 3.

Figure 11:
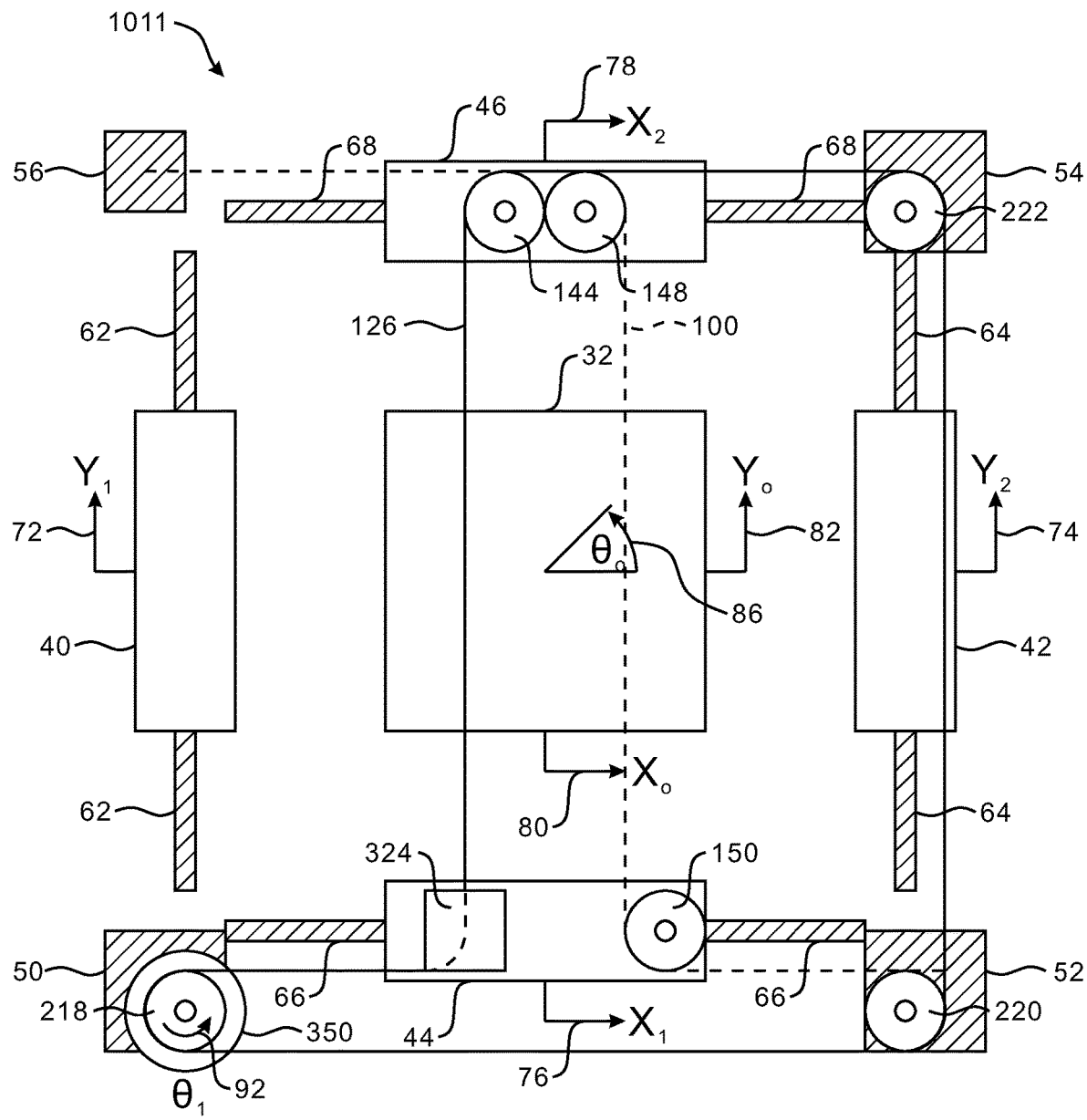
FIG. 11 is a top view schematic of a positioning system with a cable constraint for driving x-coordinate linear carriages in the x-direction.

Referring to FIG. 11, a top view schematic of a positioning system 1011 is shown, where the movement and constraining cables 34 include an x-constraint cable 100 and an x-drive-x-constraint cable 126 that constrain the motion of the x-coordinate linear carriages 44 and 46 to be the same and also constrain the displacement of the x-coordinate linear carriages 44 and 46 to be controlled by the rotation of a drive pulley 218, which is driven by an actuator 350. The rotation of the drive pulley 218 is measured by the rotational angle 92, which is referred to as $\theta_1$. The constraint is thus a modified version of the constraint illustrated in FIG. 2, with added means for driving x-coordinate linear carriages 44 and 46 via actuator 350, which is fixed to anchoring position 50.

Referring to FIG. 11, the x-drive-x-constraint cable 126 wraps without slipping around the drive pulley 218, which is mounted to the actuator 350, wraps around a pulley 220, which is mounted to the anchoring position 52, wraps around a pulley 222, which is mounted to the anchoring position 54, wraps around the pulley 144, which is mounted to the x-coordinate linear carriage 46, rigidly attaches to attachment feature 324, which is mounted to the x-coordinate linear carriage 44, and completes its loop around drive pulley 218. To balance the forces from the x-drive-x-constraint cable 126 on the x-coordinate linear carriages 44 and 46, the x-constraint cable 100, which is shown as a broken line, extends from and is anchored to anchoring position 56, wraps around the pulley 148, which is mounted on the x-coordinate linear carriage 46, wraps around the pulley 150, which is mounted on the x-coordinate linear carriage 44, and is anchored to the anchoring position 52. The cables 126 and 100 thus form a symmetrical arrangement and the system is in equilibrium with equal tensions in the two cables, neglecting external forces.

Because Equations 1 and 2 from the description of FIG. 2 apply here as well, their result that $\Delta x_1 = \Delta x_2$ also applies and the motion of the x-coordinate linear carriages 44 and 46 is constrained to be the same. In this case, however, the position of the attachment feature 324 and thus the position of the x-coordinate linear carriage 44 is controlled by the rotation of drive pulley 218. More precisely, the equation $$\Delta x_1 = -\Delta \theta_1 R_1 \qquad (18)$$

applies, where $R_1$ is the radius of the drive pulley 218. Thus the overall constraint is $\Delta x_1 = \Delta x_2 = -\Delta \theta_1 R_1$, that is, the x-coordinate linear carriages 44 and 46 are constrained to move in sync with each other and in sync with the rotation of drive pulley 218, which is controlled by actuator 350.

Figure 12:
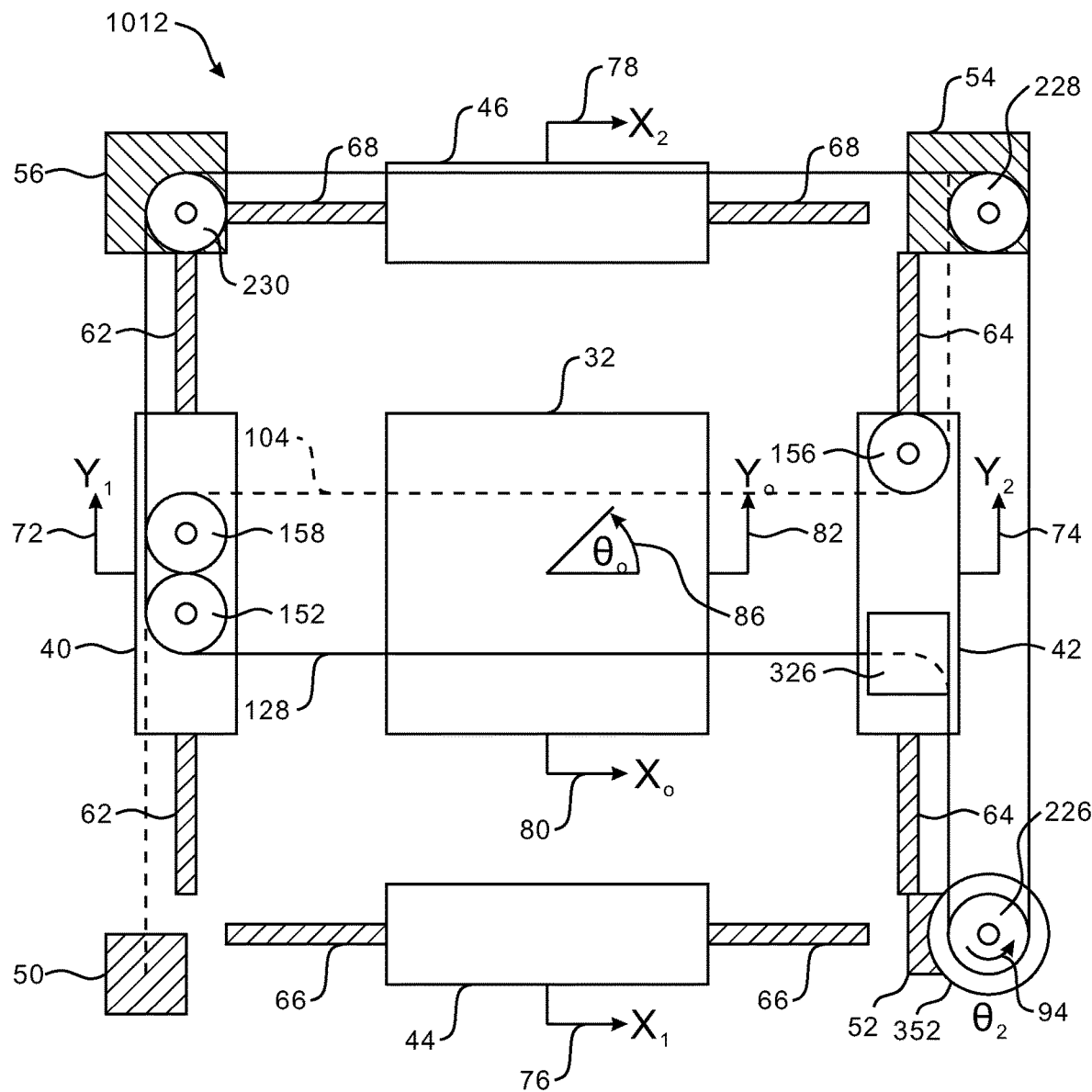
FIG. 12 is a top view schematic of a positioning system with a cable constraint for driving y-coordinate linear carriages in the y-direction.

Referring to FIG. 12, a top view schematic of a positioning system 1012 is shown, where the movement and constraining cables 34 include a y-constraint cable 104 and a y-drive-y-constraint cable 128 that constrain the motion of the y-coordinate linear carriages 40 and 42 to be the same and also constrain the displacement of the y-coordinate linear carriages 40 and 42 to be controlled by the rotation of a drive pulley 226, which is driven by an actuator 352. The rotation of the drive pulley 226 is measured by the rotational angle 94, which is referred to as $\theta_2$. The constraint is thus a modified version of the constraint illustrated in FIG. 3, with added means for driving the y-coordinate linear carriages 40 and 42 via actuator 352, which is fixed to anchoring position 52.

Referring to FIG. 12, the y-drive-y-constraint cable 128 wraps without slipping around the drive pulley 226, which is mounted to the actuator 352, wraps around a pulley 228, which is mounted to the anchoring position 54, wraps around a pulley 230, which is mounted to the anchoring position 56, wraps around the pulley 152, which is mounted to the y-coordinate linear carriage 40, rigidly attaches to attachment feature 326, which is mounted to the y-coordinate linear carriage 42, and completes its loop around drive pulley 226. To balance the forces from the y-drive-y-constraint cable 128 on the y-coordinate linear carriages 40 and 42, the y-constraint cable 104, which is shown as a broken line, extends from and is anchored to anchoring position 54, wraps around the pulley 156, which is mounted on the y-coordinate linear carriage 42, wraps around the pulley 158, which is mounted on the y-coordinate linear carriage 40, and is anchored to the anchoring position 50. The cables 128 and 104 thus form a symmetrical arrangement and the system is in equilibrium with equal tensions in the two cables, neglecting external forces.

Because Equations 3 and 4 from the description of FIG. 3 apply here as well, their result that $\Delta y_1 = \Delta y_2$ also applies and the motion of the y-coordinate linear carriages 40 and 42 is constrained to be the same. In this case, however, the position of the attachment feature 326 and thus the position of the y-coordinate linear carriage 42 is controlled by the rotation of drive pulley 226. More precisely, the equation $$\Delta y_2 = -\Delta \theta_2 R_2 \qquad (19)$$

applies, where $R_2$ is the radius of the drive pulley 226. Thus the overall constraint is $\Delta y_1 = \Delta y_2 = -\Delta \theta_2 R_2$, that is, the y-coordinate linear carriages 40 and 42 are constrained to move in sync with each other and in sync with the rotation of drive pulley 226, which is controlled by actuator 352.

Figure 13:
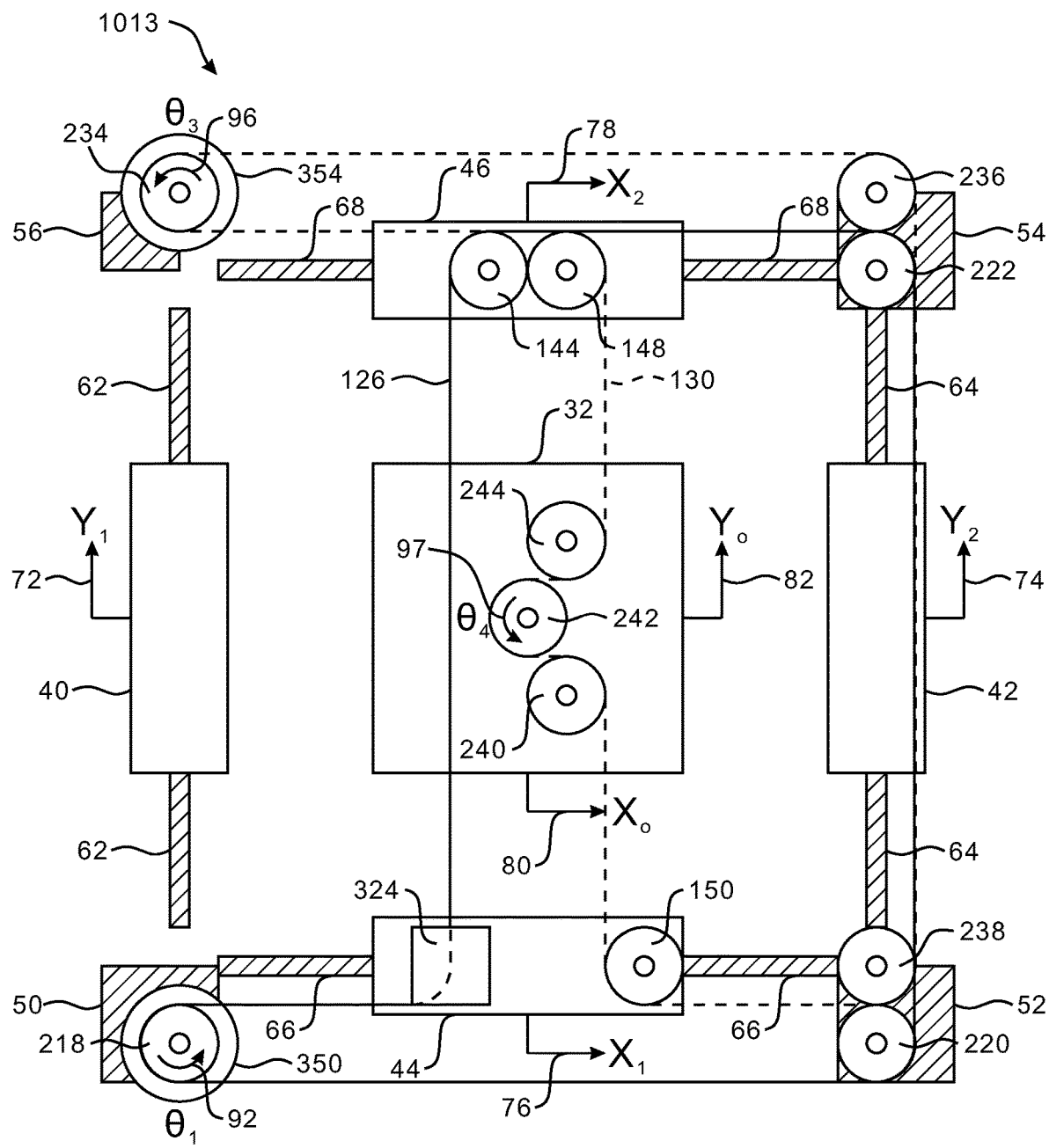
FIG. 13 is a top view schematic of a positioning system with a cable constraint for driving x-coordinate linear carriages in the x-direction and driving a pulley on the output member.

Referring to FIG. 13, a top view schematic of a positioning system 1013 is shown, where the movement and constraining cables 34 include the x-drive-x-constraint cable 126 and a $\theta_4$-drive-x-constraint cable 130 that constrain the motion of the x-coordinate linear carriages 44 and 46 to be the same and also constrain the displacement of the x-coordinate linear carriages 44 and 46 to be controlled by the rotation of the drive pulley 218, which is driven by the actuator 350, and also constrain the rotation of an output pulley 242 to be controlled by the rotation of a drive pulley 234, which is driven by an actuator 354. The rotation of the drive pulley 234 is measured by the rotational angle 96, which is referred to as $\theta_3$. The rotation of the output pulley 242 is measured by the rotational angle 97, which is referred to as $\theta_4$. The constraint is thus a modified version of the constraint illustrated in FIG. 11, with added means for driving output pulley 242 via actuator 354, which is fixed to anchoring position 56.

Referring to FIG. 13, the $\theta_4$-drive-x-constraint cable 130, which is shown as a broken line, wraps without slipping around the drive pulley 234, which is mounted to the actuator 354, wraps around a pulley 236, which is mounted to the anchoring position 54, wraps around a pulley 238, which is mounted to the anchoring position 52, wraps around the pulley 150, which is mounted to the x-coordinate linear carriage 44, wraps around a pulley 240, which is mounted to the output member 32, wraps without slipping around an output pulley 242, which is mounted to the output member 32, wraps around a pulley 244, which is mounted to the output member 32, wraps around a pulley 148, which is mounted to the x-coordinate linear carriage 46, and completes its loop around drive pulley 234. To balance the forces from the $\theta_4$-drive-x-constraint cable 130, the x-drive-x-constraint cable 126 wraps without slipping around the drive pulley 218, which is mounted to the actuator 350, wraps around the pulley 220, which is mounted to the anchoring position 52, wraps around the pulley 222, which is mounted to the anchoring position 54, wraps around the pulley 144, which is mounted to the x-coordinate linear carriage 46, rigidly attaches to attachment feature 324, which is mounted to the x-coordinate linear carriage 44, and completes its loop around drive pulley 218. The cables 130 and 126 thus form a symmetrical arrangement and the system is in equilibrium with equal tensions in the two cables, neglecting external forces.

Because the constraint front the x-drive-x-constraint cable 126 is the same here as in the description of FIG. 11, the constraint $\Delta x_1 = \Delta x_2 = -\Delta \theta_1 R_1$ applies here as well; that is, the x-coordinate linear carriages 44 and 46 are constrained to move in sync with each other and in sync with the rotation of drive pulley 218, which is controlled by actuator 350.

Additionally, the rotation of output pulley 242 is coupled to the displacement of the x-coordinate linear carriages 44 and 46, and thus to the rotation of drive pulley 218, and to the rotation of drive pulley 234, according to the equation $$\Delta \theta_4 = \frac{\Delta \theta_3 R_3 - \Delta x_2}{R_4} = \frac{\Delta \theta_3 R_3 + \Delta \theta_1 R_1}{R_4},$$

where $R_3$ is the radius of the drive pulley 234 and $R_4$ is the radius of the output pulley 234.

It is noted that additional drive constraints similar to those of FIGS. 11-13 can be added to drive additional degrees of freedom on the output member 32.

Figure 14:
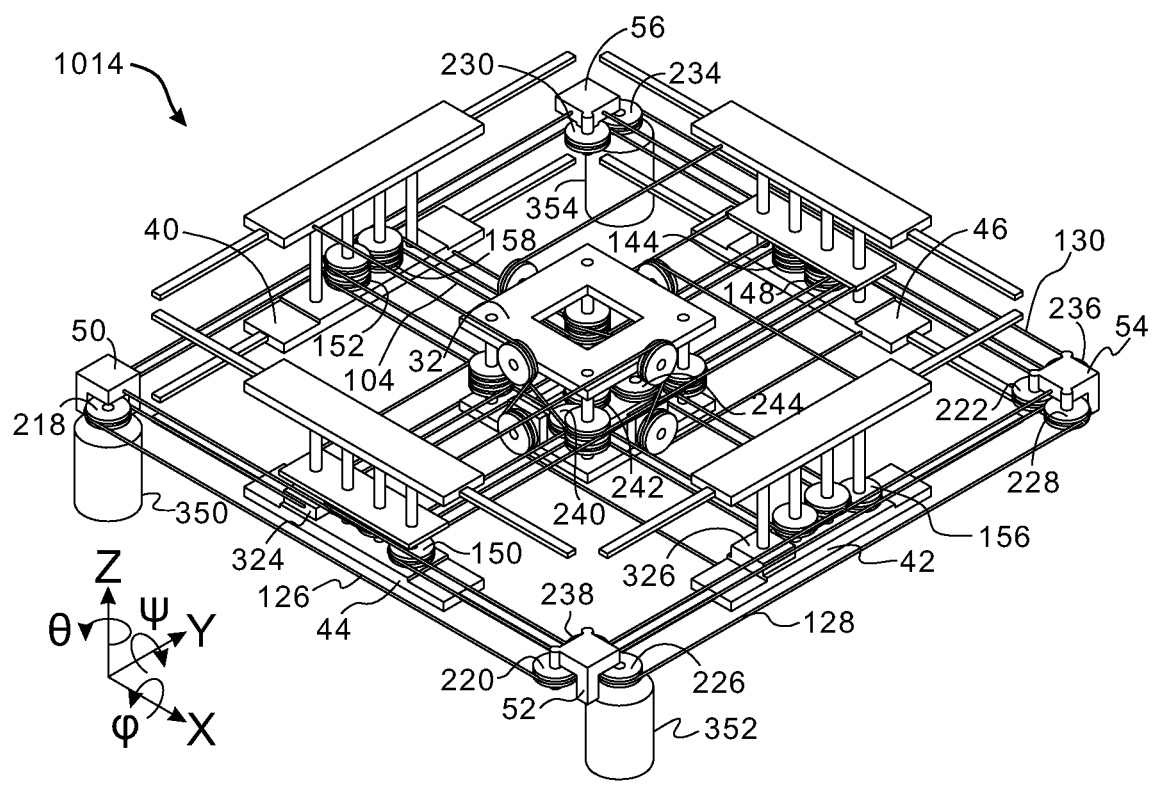
FIG. 14 is a perspective view of a positioning system with cable constraints that drive an output member and an output pulley and prevent rotation of the output member about its X-, Y-, and Z-axes.

Referring to FIG. 14, a perspective view of a positioning system 1014 is shown, where the movement and constraining cables 34 include all six of the cable constraints from FIG. 4, FIG. 6, FIG. 8, FIG. 9, FIG. 11, and FIG. 13. The combination of constraints results in a constraint that $\Delta x_o = \Delta x_1 = \Delta x_2 = -\Delta \theta_1 R_1$, $\Delta y_o = \Delta y_1 = \Delta y_2 = -\Delta \theta_2 R_2$, $\Delta \theta_o = 0$, $\Delta \phi_o = 0$, $\Delta \psi_o = 0$, and $$\Delta \theta_4 = \frac{\Delta \theta_3 R_3 + \Delta \theta_1 R_1}{R_4}.$$

Thus, the combination of the six constraints constrains the output member 32 and the two x-coordinate linear carriages 44 and 46 to move in sync with each other in the x-direction and to be controlled by the actuator 350, and constrains the output member 32 and the two y-coordinate linear carriages 44 and 46 to move in sync with each other in the y-direction and to be controlled by the actuator 352, and constrains the output member 32 from rotating about its Z-axis, its Y-axis, and its X-axis, and constrains the output pulley 242 to be controlled by both actuators 350 and 354.

Referring to FIG. 14, four of the constraints are described in more detail in reference to FIGS. 4-10. The pulleys 218, 220, 222, and 144, and attachment feature 324, and actuator 350, and the constraining cable 126, and the pulleys 234, 236, 238, 150, 240, 242, 244, and 148, and the actuator 354, and constraining cable 130 form a fifth constraint, described in more detail in reference to FIG. 13, for constraining the x-coordinate linear carriages 44 and 46 to move in sync with each other and with actuator 350, and for constraining the output pulley 242 to rotate in sync with actuator 350 and actuator 354. The pulleys 226, 228, 230, and 152, and attachment feature 326, and actuator 352, and the constraining cable 128 and the pulleys 156 and 158, and constraining cable 104 form a sixth constraint, described in more detail in reference to FIG. 12, for constraining the y-coordinate linear carriages 40 and 42 to move in sync with each other and with actuator 352. The other features in FIG. 14 are discussed in the descriptions of FIG. 5, FIG. 7, and FIG. 10.

The design of the cable constraint for preventing Z-displacement of the output member 32 is unique in that it introduces an additional component to account for the non-linearly chancing lengths of cables that must lie at an angle to the direction of motion.

Figure 15:
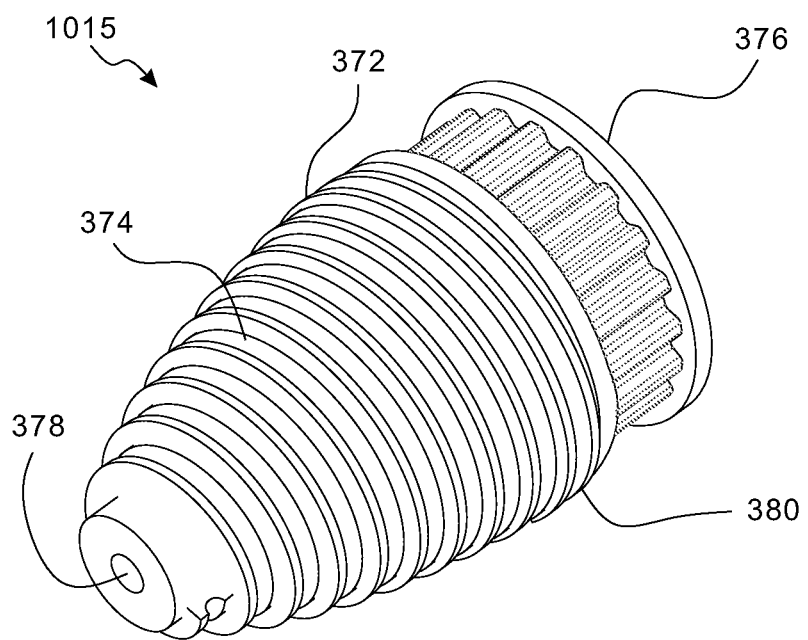
FIG. 15 is a perspective view of a variable radius spool with a synchronizing element.

Referring to FIG. 15, a synchronous variable radius spool 1015 for obtaining a prescribed variable rate of winding and unwinding of cable is shown. A variable radius spool 372 has a helical groove 374 for winding cable without overlapping. The groove 374 has a variable radius. A motion synchronizing element 376 is rigidly coupled to the variable radius spool 372 and rotates together with the variable radius spool 372 on axis 378. For the purpose of illustration, the motion synchronizing element 376 is shown as a timing belt pulley, but could include and is not limited to a gear, a pulley, or a spool of constant radius. The variable radius spool 372 has an attachment point 380 for fastening one end of a wrapped cable. For a given rate of rotation of the spool 372, the rate at which the spool winds or unwinds cable will vary depending on the radius of the spool at the point of intersection with the free length of cable. The rate will increase with increasing radius and decrease with decreasing radius.

Figure 16:
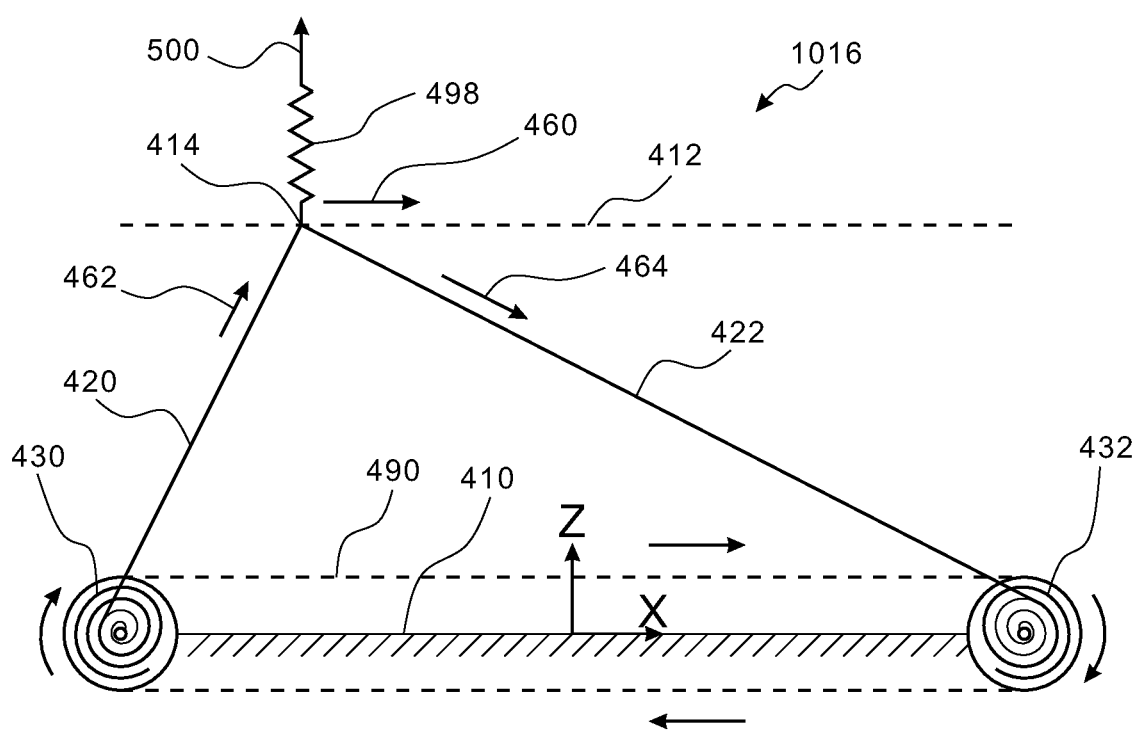
FIG. 16 is a schematic view of a linear constraint system using two variable radius spools fixed to opposite ends of a base plane.

Referring to FIG. 16, a system 1016 for achieving unidirectionally constrained straight line motion using cables is shown. Synchronous variable radius spools 430 and 432 an spools similar to that of FIG. 15. Spool 430 is fixed to the left side of base 410, and is free to rotate about its axis. Spool 432 is fixed to the right side of base 410, and is free to rotate about its axis. Synchronizing transmission element 490 engages the synchronizing elements of spools 430 and 432 and thus constrains them to rotate at dependent rates. The synchronizing transmission element 490 can include, but is not limited to, a timing belt, a non-slipping belt, a non-slipping cable, or a gear. Spools 430 and 432 are configured so that when one is winding cable, the other is unwinding cable. Cable 420 is partially wound on spool 430 and cable 422 is partially wound on spool 432. Cables 420 and 422 meet at point 414, which, for the purpose of illustration, is pulled upward by force 500 through spring 498 in order to maintain positive tension in the cables 420 and 422. The point 414 is shown having a velocity 460. Based on the geometry of system 1016, the location of point 414 in the xz-plane is completely determined by the free lengths of cables 420 and 422, which is determined by the rotations of spools 430 and 432, which are dependent on each other. Thus, this system has a single degree of freedom. The point 414 is constrained from moving farther away from the base 410 by the cables 420 and 422. The variable radii of spools 430 and 432 are designed such that point 414 is constrained to lie on straight line 412 at any point in its range of motion, given that the cables are maintained in tension. To achieve that constraint, a given spool's radius at the point of intersection with the free length of its respective cable decreases as point 414 approaches the spool and increases as point 414 moves farther away from the spool, in order to keep the rate of winding or unwinding of cable equal to the component of the velocity 460 of point 414 in the direction of the cable. When point 414 is almost directly overhead a cable's point of intersection with its spool, the component of the point's velocity in the direction of the cable is almost zero and thus the radius of the spool will be very small. As point 414 moves farther away from the spool and the cable becomes more horizontal, the component of the velocity in the direction of the cable approaches the full magnitude of the velocity 460 and the radius of the spool approaches a maximum limit. Referring to FIG. 15, because of the proximity of point 414 to spool 430, the unwinding rate 462 of cable 420 is relatively small and the radius of spool 430 at its point of intersection with cable 420 is small. On the other hand, because of the relatively large distance of point 414 from spool 432, the winding rate 464 of cable 422 is relatively large and the radius at its point of intersection with spool 432 is large.

One possible issue with the system of FIG. 16 is that the required spool radius shrinks to zero as point 414 approaches a spool. This can be harmful to the cable if the radius goes below the minimum recommended bending radius for the cable. It can also make it impossible to design the spool's radius to achieve the desired range of motion. One way to alleviate this problem is to use differential spools.

Figure 17:
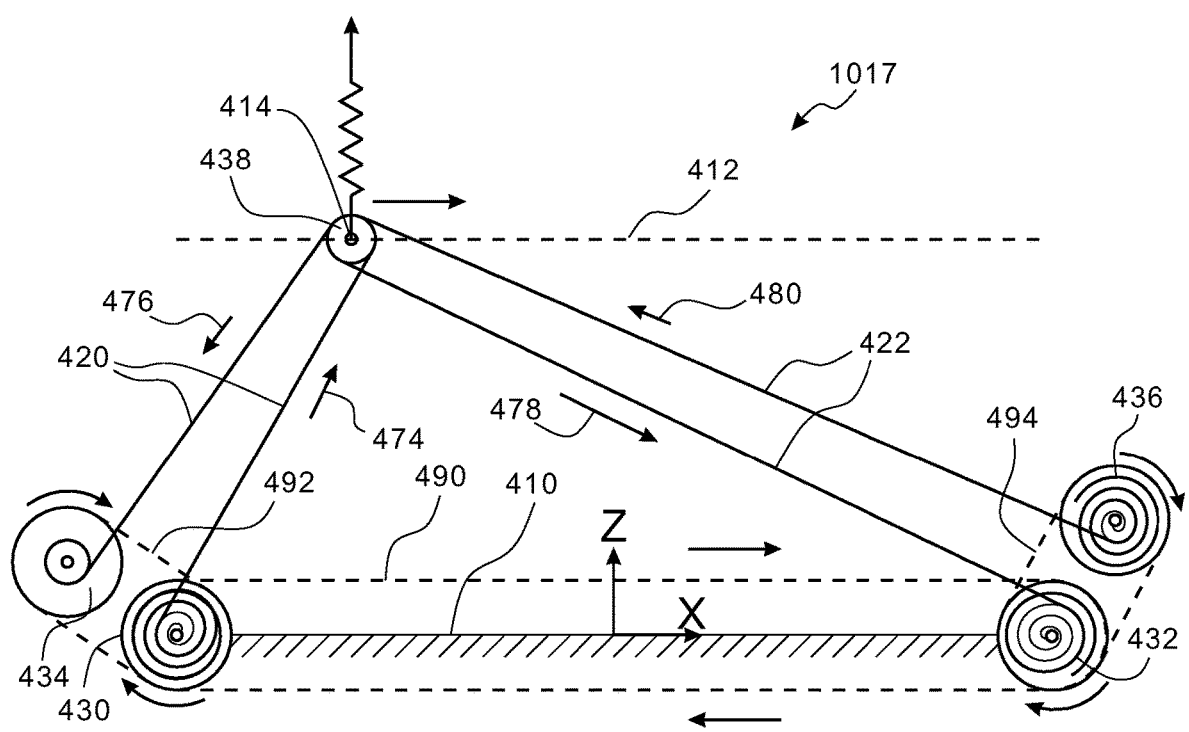
FIG. 17 is a schematic view of a linear constraint system using two variable radius spool differentials.

Referring to FIG. 17, a system 1017 for achieving unidirectionally constrained straight line motion using differential variable radius spools is shown. Cable 420 is partially wound on synchronous variable radius spool 430, which is fixed to base 410 and is free to rotate about its axis, wraps around pulley 438, which is free to rotate about its center at point 414, and is partially wound on constant radius spool 434, which is fixed to base 410 and is free to rotate about its axis. Both spools 430 and 434 are constrained to rotate together by a synchronizing transmission element 492, which engages a synchronizing element of both spool 430 and spool 434. The rate at which the distance from the spools 430 and 434 to point 414 increases (decreases) is equal to the difference between the rate at which spool 430 unwinds (winds) and the rate at which spool 434 winds (unwinds). When the two rates become equal because the two radii become equal, then the rate of change of distance to point 414 becomes equal to zero. This enables the use of sufficiently large-diameter spools even as the rate of change of distance from the spools to point 414 becomes equal to zero. The differential rate of winding or unwinding can even change signs, permitting extending the range of motion beyond just the region between the opposite end spools. The same situation described for the differential arrangement of spools 430 and 434, synchronizing transmission element 492, cable 420, and pulley 438 exists for spools 432 and 436, cable 422, synchronizing transmission element 494, and pulley 438, except that spool 436 is shown as a variable radius spool. The rotation of the pair of spools 430 and 434 is synchronized with the rotation of the pair of spools 432 and 436 by the synchronizing transmission element 490. Similar to as was described in reference to FIG. 16, the radii of spools 430, 432, 434, and 436 are designed such that point 414 is constrained to lie on straight line 412 at any point in its range of motion, given that the cables are maintained in tension.

Figure 18:
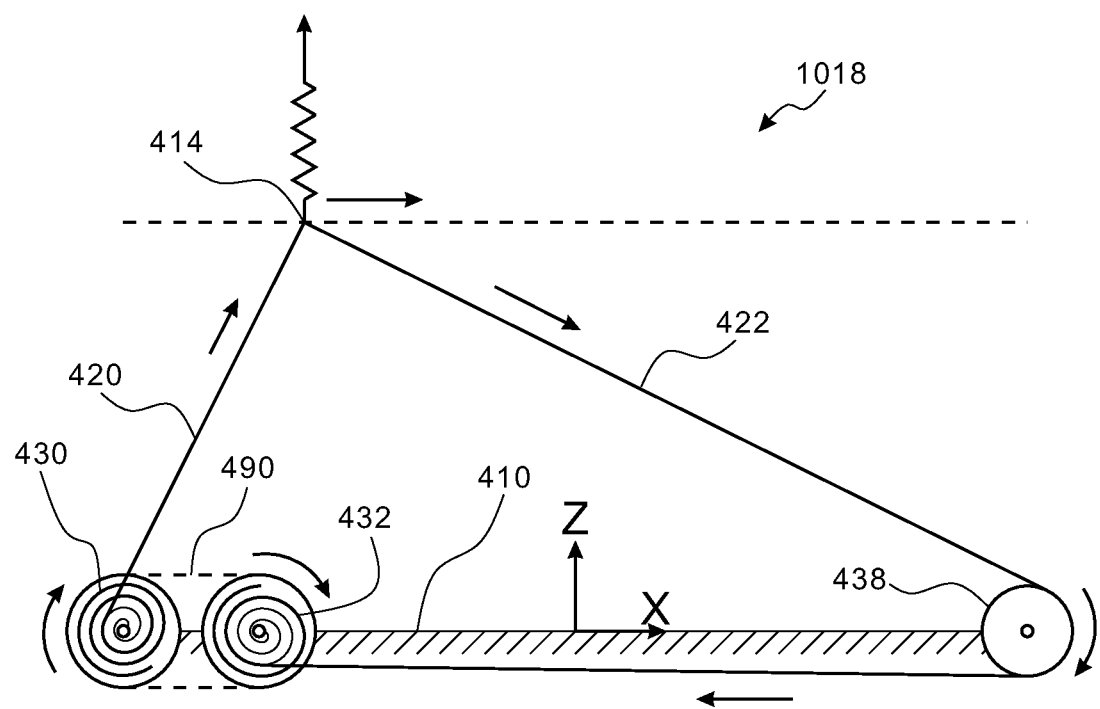
FIG. 18 is a schematic view of a linear constraint system using two variable radius spools fixed to one end of a base plane.

Referring to FIG. 18, a system 1018 for achieving unidirectionally constrained straight line motion using cables and two adjacent synchronous variable radius spools is shown. The configuration is the same as that of FIG. 16, except that spool 432 has been moved adjacent to spool 430 and pulley 438 has been added at the right side to connect the cable 422 to spool 432.

It is recognized that it could be advantageous in some circumstances to replace the two synchronous variable radius spools 430 and 432 with a single spool having the variable radii of both integrated in a single component.

Figure 19:
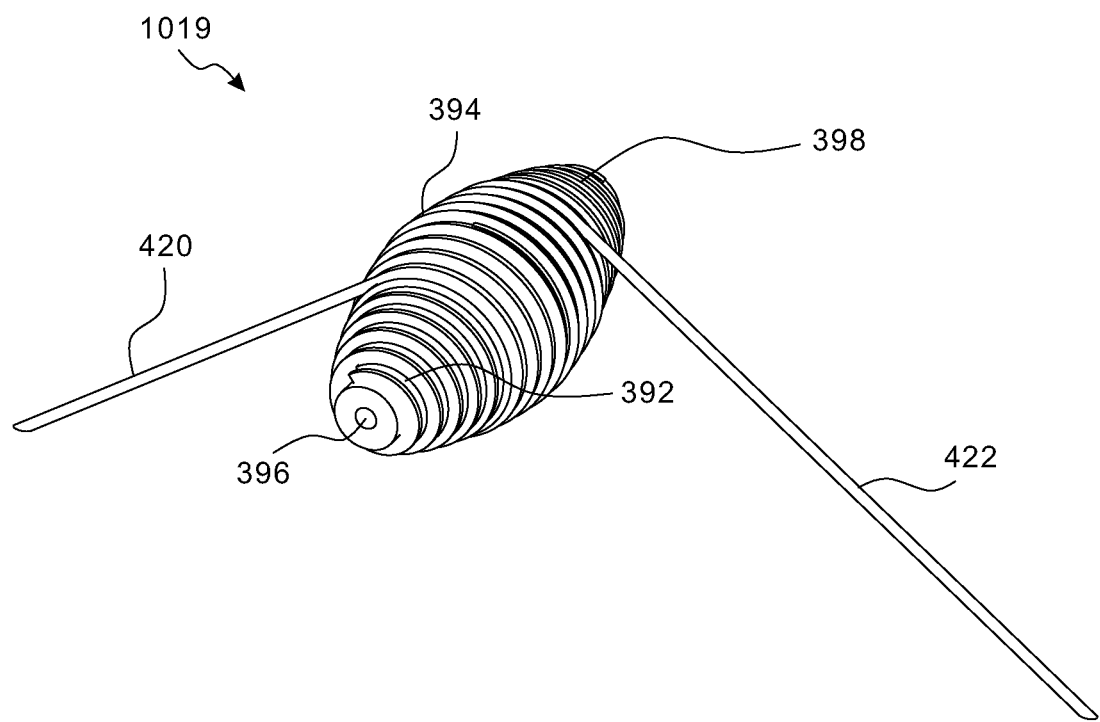
FIG. 19 is a perspective view of a double-sided variable radius spool having two free ends of cable.

Referring to FIG. 19, a system 1019 comprising a double-sided variable radius spool and cable for obtaining a prescribed variable rate of winding and unwinding of cable is shown. A double-sided variable radius spool 398 has a groove 392 for winding cable without overlapping. The groove 392 has a variable radius. A cable 420 is wound onto the variable radius spool 398 in the groove 392 from the front side of the spool. Another cable 422 is wound onto the variable radius spool 398 in the groove 392 from the rear side of the spool. In this case, the cables 420 and 422 are part of the same cable, but that need not be the case. The spool 398 is able to rotate about an axis of rotation 396. As the spool 398 rotates, the respective lengths of the cables 420 and 422 change at rates that vary according to the rate of rotation and the radii of the groove 392 at their respective points of intersection with the spool 398. It is noted that a counterclockwise rotation of the spool will cause cable 420 to lengthen at an increasingly faster rate as the radius of the spool at its intersection point increases until reaching the center of the spool 398. The same counterclockwise rotation of the spool will cause cable 422 to shorten at an increasingly slower rate as the radius of the spool at its intersection point increases until reaching the rear end of the spool 398. Reversing the direction of rotation of the spool will reverse the roles of the cables 420 and 422. Rotating the spool 398 counterclockwise and clockwise repeatedly will shuttle the wound length of cable backward and forward relative to the center of the spool. In the center, as shown, where the radius is largest, the wound length is greatest and the free length is least, while at the two ends, where the radius is smallest, the wound length will be least and the free length will be greatest. This corresponds to the geometry required for straight line motion. At the center of the range of motion, when the cable is centered on the spool 398, the total free length of cable is least. At the extremities of the range of motion, when the cable is gathered near one of the ends of the spool 398, the total free length of cable is greatest.

Figure 20:
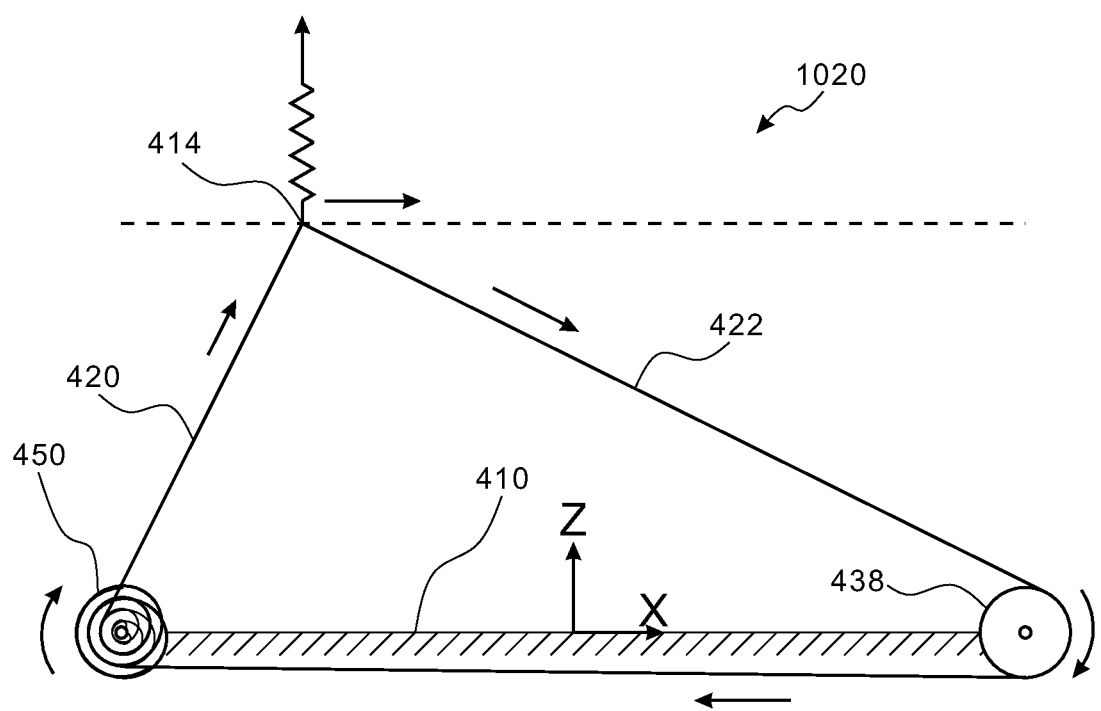
FIG. 20 is a schematic view of a linear constraint system using a doable-sided variable radius spool fixed to a base plane.

Referring to FIG. 20, a system 1020 for achieving unidirectionally constrained straight line motion using cables and a single, fixed, double-sided variable radius spool, similar to that of FIG. 19, is shown. The configuration is similar to that of FIG. 18, except that the two synchronized spools have been replaced by the single, double-sided variable radius spool 450 having both variable radius grooves integrated in a single body.

Figure 21:
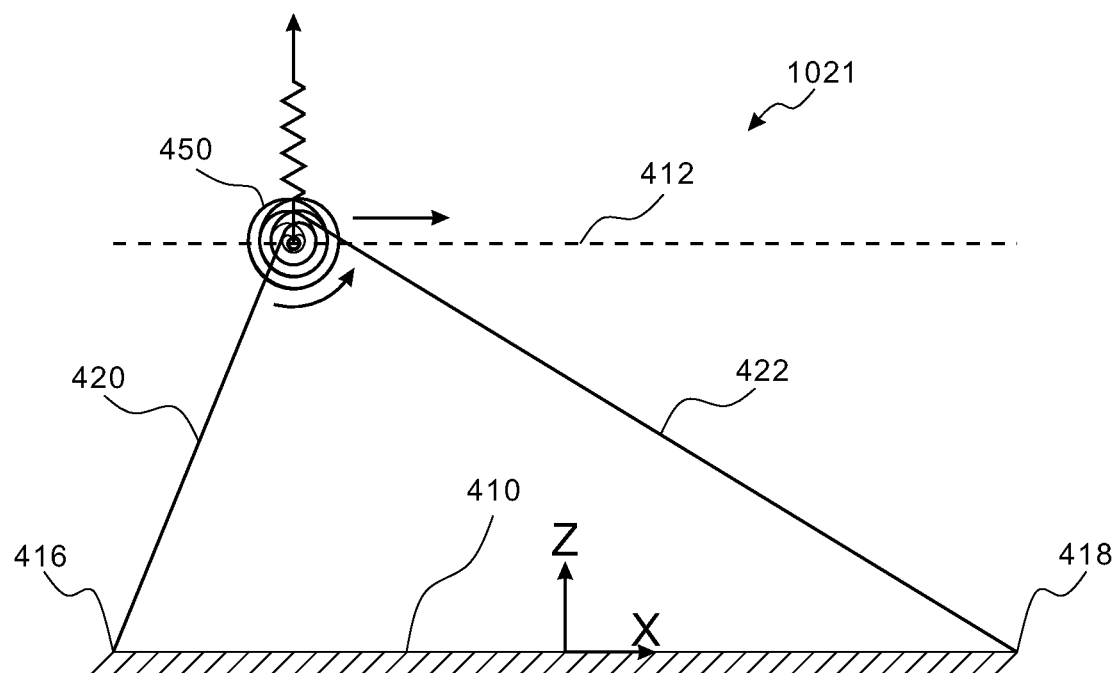
FIG. 21 is a schematic view of a linear constraint system using a moving double-sided variable radius spool.

Referring to FIG. 21, a system 1021 for achieving unidirectionally constrained straight line motion using cables and a single, moving, double-sided variable radius spool is shown. Cable 420 is anchored to the base 410 at an anchoring point 416 and cable 422 is anchored to the base 410 at an anchoring point 418. As the double-sided variable radius spool 450 moves to the right along the straight line path 412, it rotates counterclockwise, unwinding cable 420 to its left and winding up cable 422 to its right. The rates at which it unwinds and winds cable as a function of its position and velocity are determined by the shape of the spool and are designed to maintain a straight-line motion along the straight-line path 412.

Figure 22A:
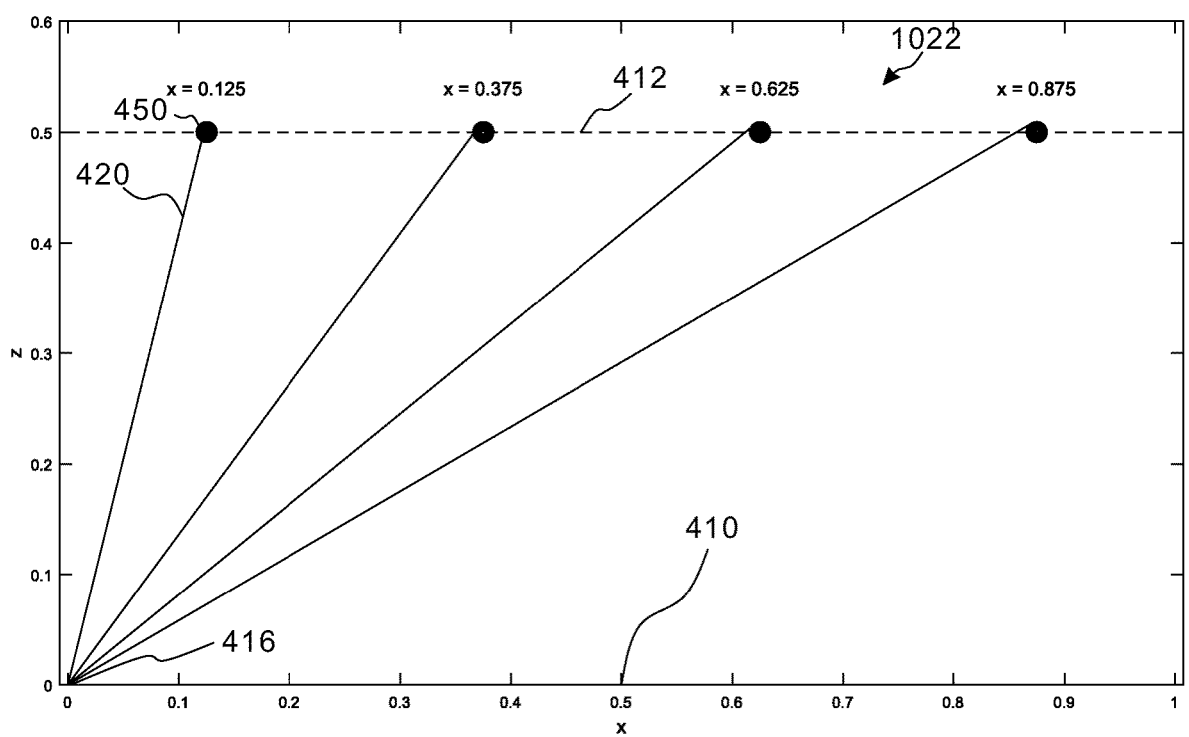
FIG. 22A illustrates a left half of a linear constraint system using a moving double-sided variable radius spool at several positions in its range of motion.
Figure 22B:
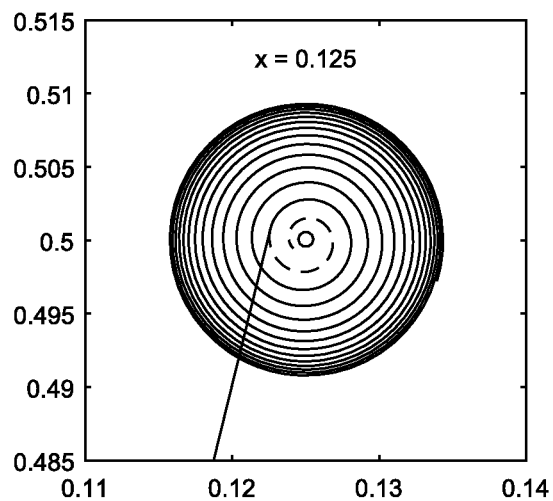
FIGS. 22B-E are close-up views of the variable radius spool from FIG. 22A at several positions in its range of motion.
Figure 22C:
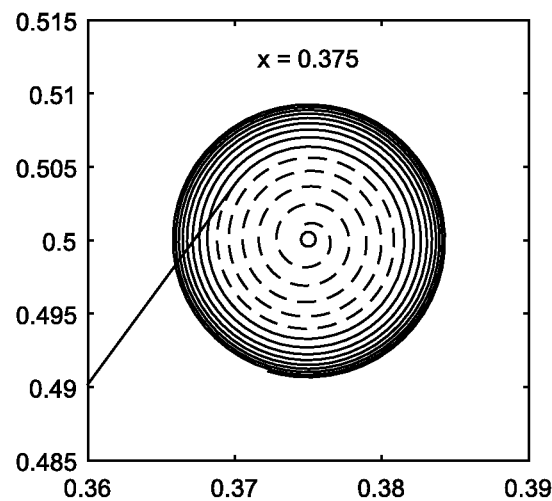
Figure 22D:
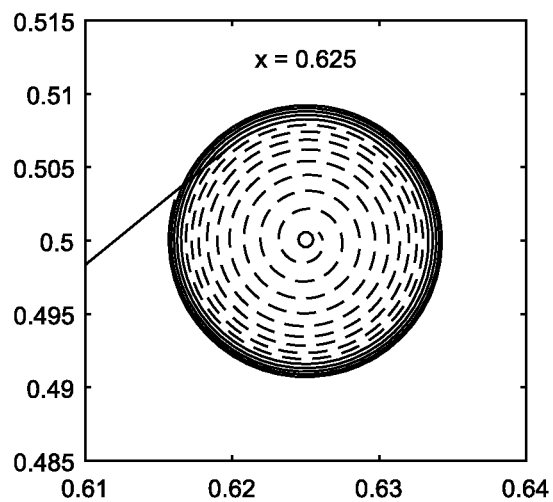
Figure 22E:
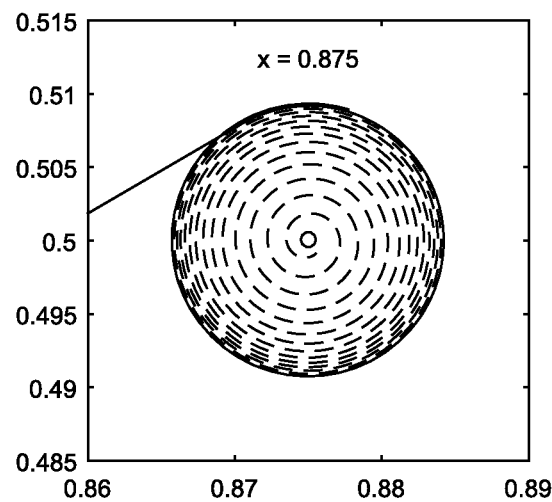

Referring to FIG. 22A, a system 1022 like one half of that of FIG. 21 for achieving unidirectionally constrained straight line motion is shown at various positions along its path. The double-sided variable radius spool 450 is shown with the single cable 420 to its left and anchored to the base 410 at the anchoring point 416. The rate of rotation of spool 450 is dependent on its velocity, and the shape of the spool is equivalent for maintaining the necessary length of cable 420 to keep the axis of rotation of spool 450 on the straight line path 412 at each position along its path. It is understood that, although the cable to the right of the spool has not been shown, its effect in completing the constraint is still in effect to keep the spool on its straight line path.

Referring to FIGS. 22B-22E, close-up views of one half of the double-sided variable radius spool of FIG. 22A are shown at various positions along its path. The radius at the point of intersection with the cable increases as the distance of the spool from its anchoring point increases and the cable becomes more horizontal.

In order to determine the precise shape of the spool necessary for maintaining the desired straight-line motion, it is necessary to consider the geometry of the system. Taking the system of FIG. 22A as an example, the radius of the spool can be determined iteratively assuming small displacements from a previous known solution by recognizing the constraint $$\frac{ds}{d\alpha} = -\frac{dL}{d\alpha} \qquad (20)$$

where s is defined as the arc length of cable wrapped on the spool, relative to the center of the spool, L is defined as the free cable length between the spool and the cable's anchor point on the base, and α is defined as the angle through which the spool has rotated relative to an arbitrary reference angle. In words, the rate at which the length of wound cable increases is equal to the rate at which the length of free cable decreases. The length of wound cable is primarily a function of the spool's shape, and the length of free cable is primarily a function of the overall geometry of the system. Given knowledge of the spool's rate of rotation as a function of its velocity and a previous valid solution for the radius of the spool, it should be possible to converge to a solution for the current radius of the spool, based on the geometry of the system and Equation 20. This process can be repeated to generate a full solution for the spool's radius as a function of the angle α, starting from a position sufficiently far from the anchor point to treat the cable as being essentially horizontal and thus to approximate the radius of the spool as being $$\frac{dx}{d\alpha}.$$

The same procedure is possible for other geometries, including, but not limited to, straight lines at an angle to the base or smooth curves of arbitrary shape, provided that the equations that are solved are adjusted to reflect the particular geometry.

Figure 22F:
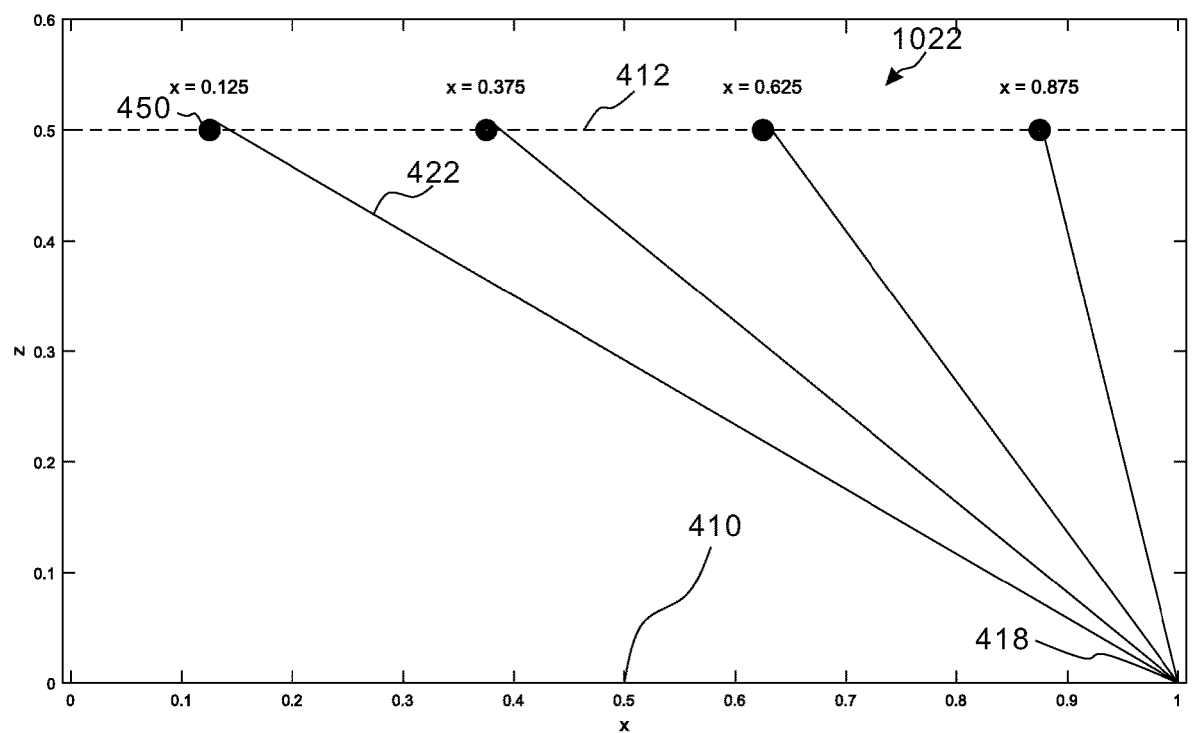
FIG. 22F illustrates a right half of a linear constraint system using a variable radius spool at several positions in its range of motion.
Figure 22G:
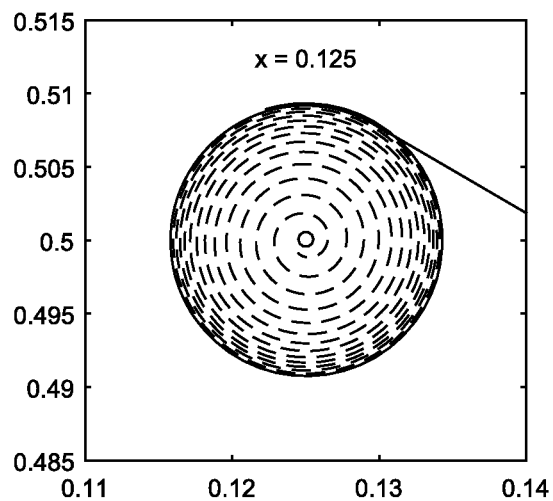
FIGS. 22G-H and J-K are close-up views of the variable radius spool from FIG. 224 at several points in its range of motion.
Figure 22H:
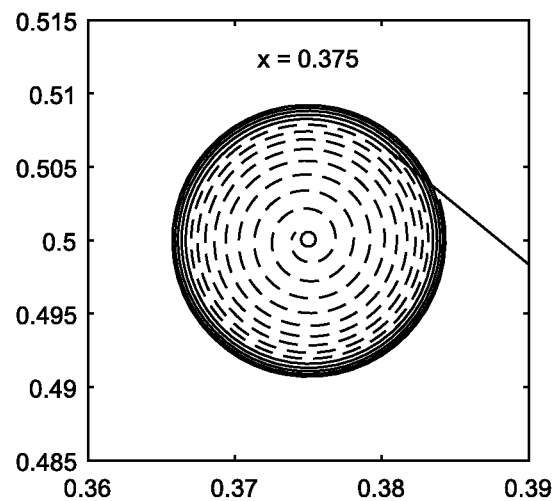
Figure 22J:
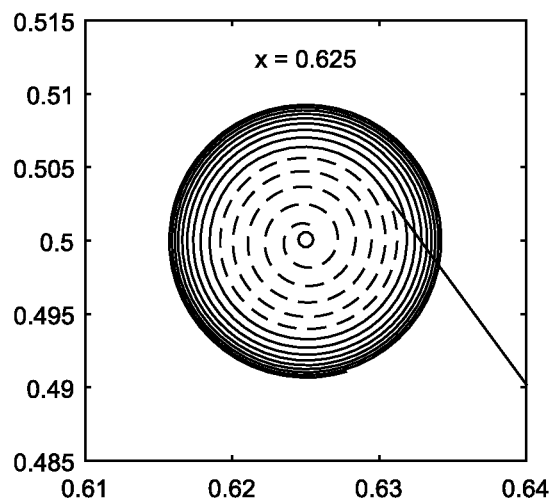
FIG. 22L illustrates both halves of a moving variable radius spool at several positions in its range of motion.
FIGS. 22M-P are close-up views of the variable radius spool from FIG. 22L at several positions in its range of motion.
Figure 22K:
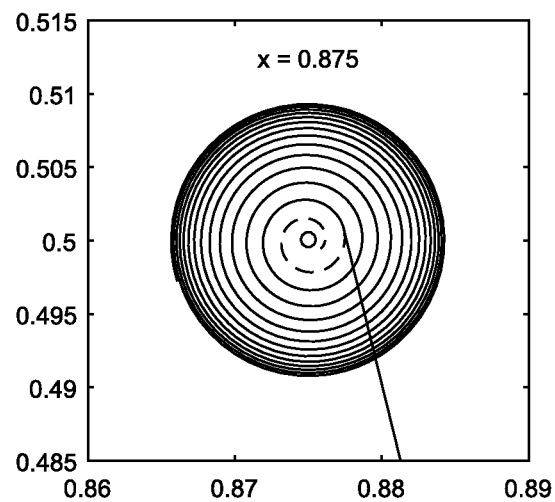

Referring to FIG. 22F, a system 1022 like one half of that of FIG. 21 for achieving unidirectionally constrained straight line motion is shown at various positions along its path. The double-sided variable radius spool 450 is shown with the single cable 422 to its right and anchored to the base 410 at the anchoring point 418. The rate of rotation of spool 450 is dependent on its velocity and the shape of the spool is equivalent for maintaining the necessary length of cable 422 to keep the axis of rotation of spool 450 on the straight line path 412 at each position along its path. Comparing FIG. 22F to FIG. 22A, it is recognized that, in this case, the two configurations are a mirror image of one another and, therefore, that the groove profiles required will be the same, except flipped 180 degrees. It is understood that, although the cable to the left of the spool has not been shown, its effect in completing the constraint is still in effect to keep the spool on its straight line path.

Referring to FIGS. 22G-22K, close-up views of one half of the double-sided variable radius spool of FIG. 22F are shown at various positions along its path.

Figure 22L:
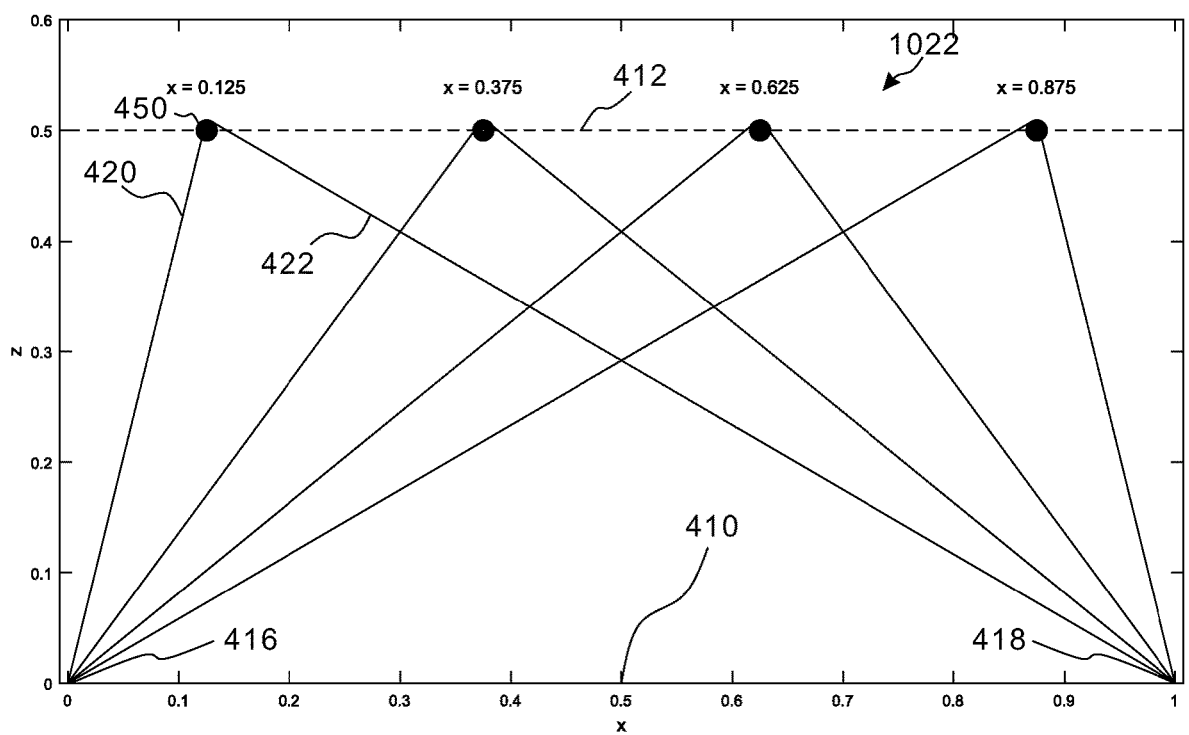
Figure 22M:
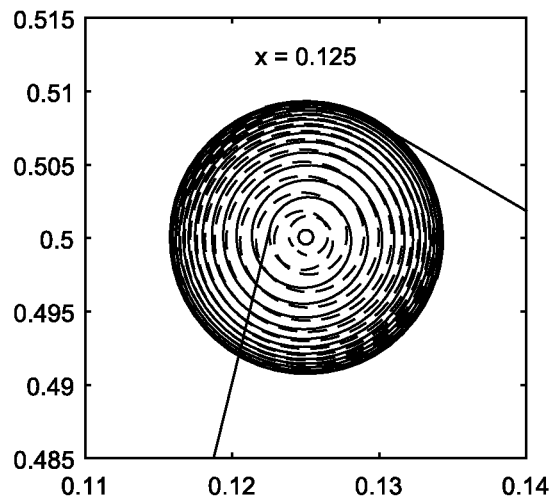
Figure 22N:
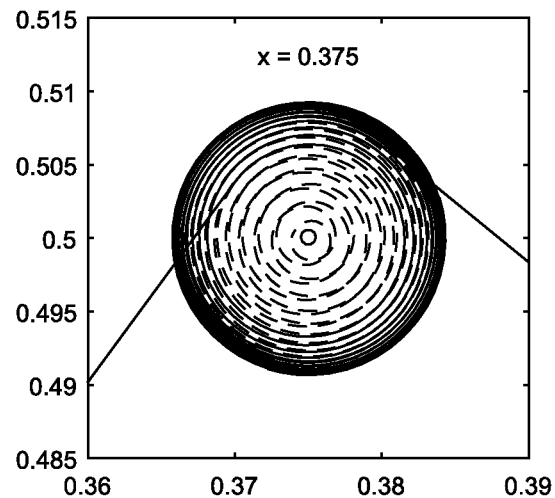
Figure 22O:
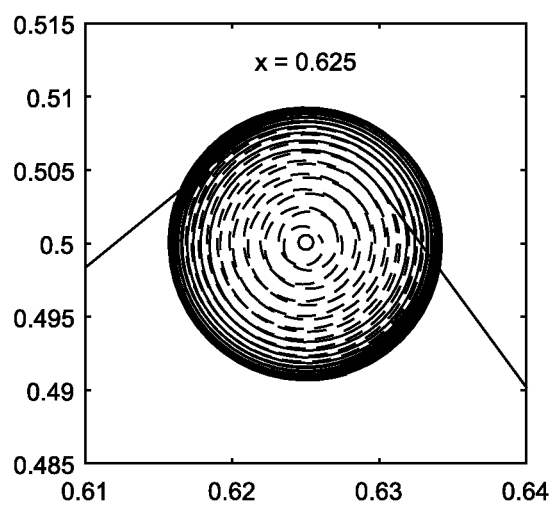
Figure 22P:
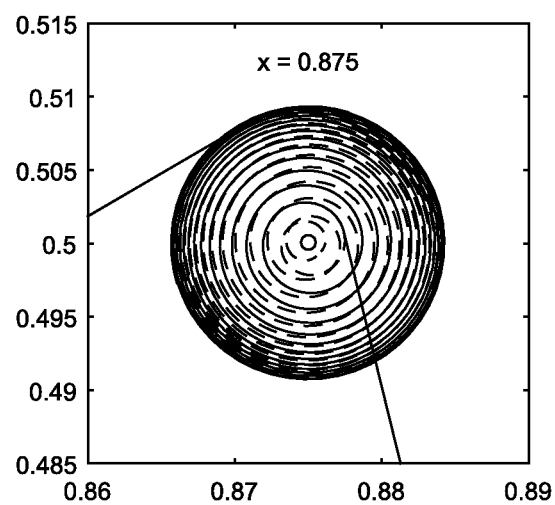

Referring to FIG. 22L, a system 1022 like that of FIG. 21 for achieving unidirectionally constrained straight line motion is shown at various positions along its path. The double-sided variable radius spool 450 is shown with the cables 420 and 422 to its left and right, respectively, and anchored to the base 410 at the anchoring points 416 and 418, respectively. The rate of rotation of spool 450 is dependent on its velocity and the shape of the spool is equivalent for maintaining the necessary lengths of cable 420 and 422 to keep the axis of rotation of spool 450 on the straight line path 412 at each position along its path. It is recognized that one half of the full groove profile for the double-sided variable radius spool 450 will be that shown in FIGS. 22A-E, and one half will be that shown in FIGS. 22F-K.

Referring to FIGS. 22M-22P, close-up views of the double-sided variable radius spool of FIG. 22L are shown at various positions along its path.

It is understood that the double-sided variable radius spool profiles shown in FIGS. 22L-22P correspond to a two-dimensional projection of the three-dimensional view of a similar spool shown in FIG. 19.

It is noted that, although a two-dimensional interpretation of the unidirectional straight-line constraint has been the focus here, a three-dimensional interpretation is valid as well. Taking the spool 350 of FIG. 22L as an example, in three dimensions, the spool at a particular position along its path is no longer confined to the plane of the figure, but has an extra degree of freedom to rotate into and out of the figure plane about the axis defined by the anchor points 416 and 418. In doing so, if both of its cables are maintained in tension, it will trace out a semi-circular path about the X-axis at each position along its path. Each circular path will have a point of maximum distance from and above the base plane 410. The locus of these points of maximum distance above the plane defines the desired straight-line path 412. The spool is prevented by the unidirectional straight-line constraint from passing beyond a plane defined by the plane parallel to the base plane that passes through the locus of points of maximum distance.

It is noted that, although the descriptions of FIGS. 15-22P have focused on achieving straight line motion parallel to a base plane, other trajectories are possible simply by accounting for the desired geometry in the equations that are solved when generating the required shape of the spool.

It is noted that 3D printing, or additive manufacturing, can be a particularly suitable method of manufacturing the variable radius spools because the shape of each spool will need to be customized for a particular geometry, depending on the application.

It is noted that the variable radius spools can be combined and configured in various ways to achieve desired constraints.

Figure 23A:
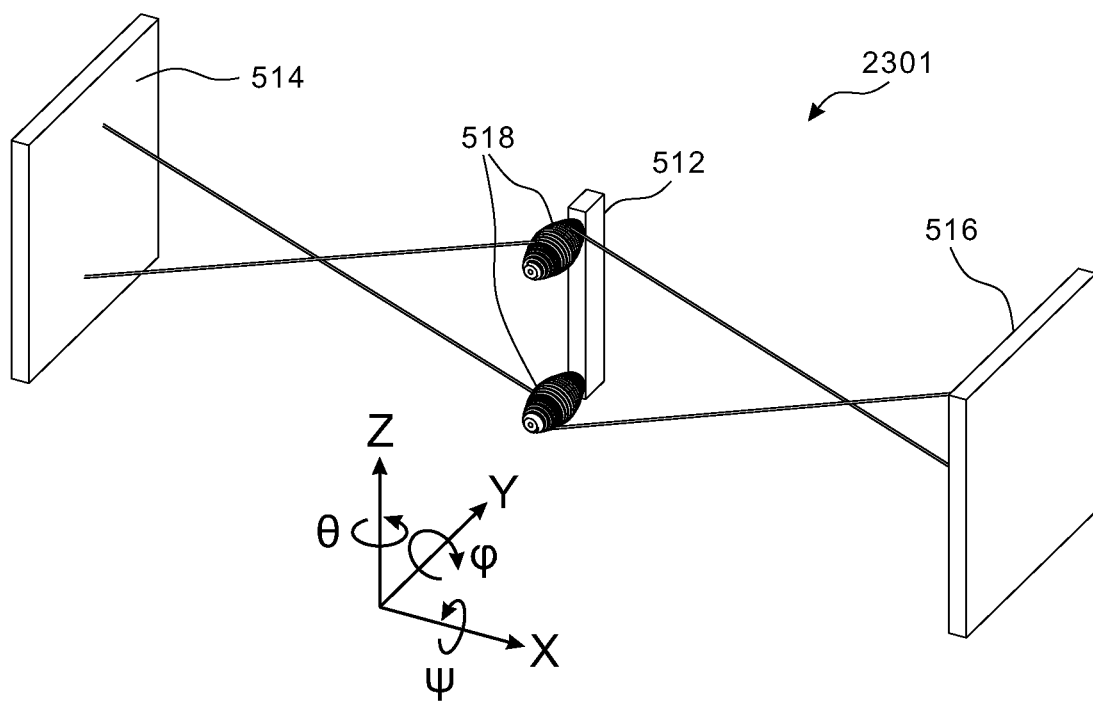
FIG. 23A is a perspective view of a linear constraint system using two double-sided variable radius spools.

Referring to FIG. 23A, a perspective view of a linear constraint 2301 using two double-sided variable radius spools is shown. A set of two opposing double-sided variable radius spools 518 provides a balanced constraint that eliminates the need for the spring 500 that was shown for the purpose of illustration in FIG. 21. It is recognized that each of the double-sided variable radius spools 518 corresponds to a single embodiment of the moving spool system 1021 of FIG. 21. The linear constraint 2301 acts as a linear bearing permitting straight-line motion in the x-direction for an output member 512, and resisting forces in the Z-direction. It is noted that the two ends of cable for each of the double-sided variable radius spools 518 are displaced linearly in the Y-direction from each other, which will provide some degree of resistance to rotation about the Z-axis, as well, depending on the amount of displacement. The anchoring blocks 514 and 516 transmit forces from the linear constraint 2301 to a rigid frame, which, for the purpose of clarity, is not shown.

Figure 23B:
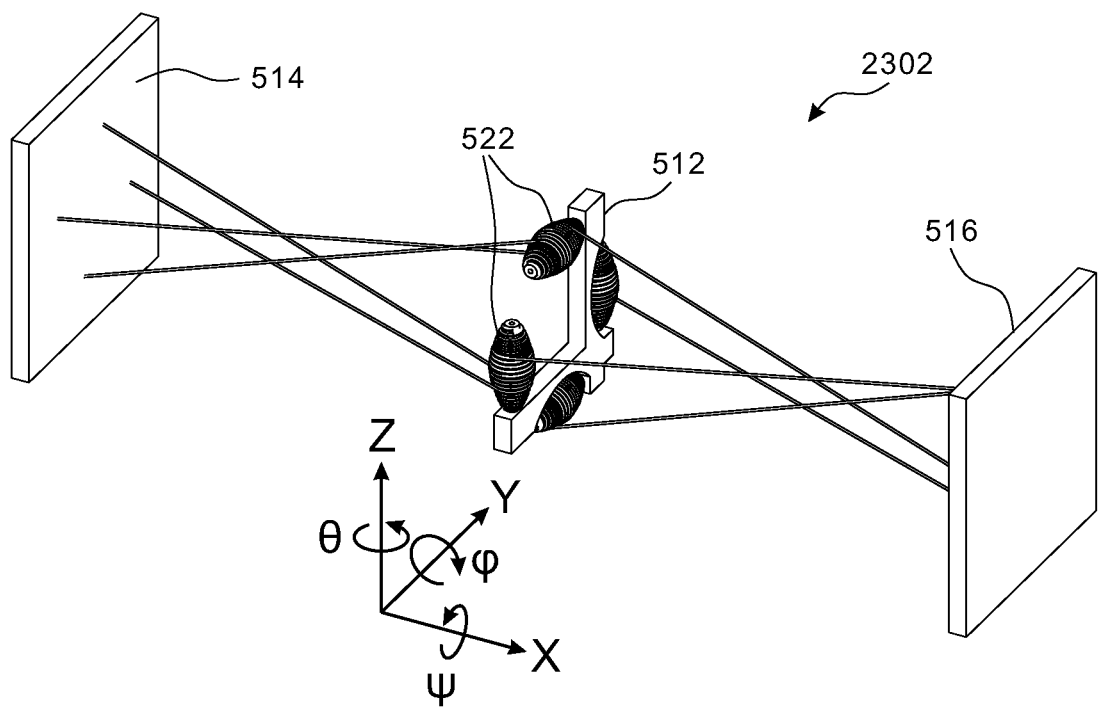
FIG. 23B is a perspective view of a linear constraint system using four double-sided variable radius spools.

Referring to FIG. 23B, a perspective view of a linear constraint 2302 using four double-sided variable radius spools is shown. The set of four double-sided variable radius spools 522 provides a balanced constraint that acts as a linear bearing permitting straight-line motion in the x-direction for the output member 512, and resisting forces in both the y- and z-directions.

It is noted that these constraints can also be combined with one or more of the constraints from FIGS. 6 and 8 to constrain the output member 512 against rotations about the y- or z-axes.

Figure 23C:
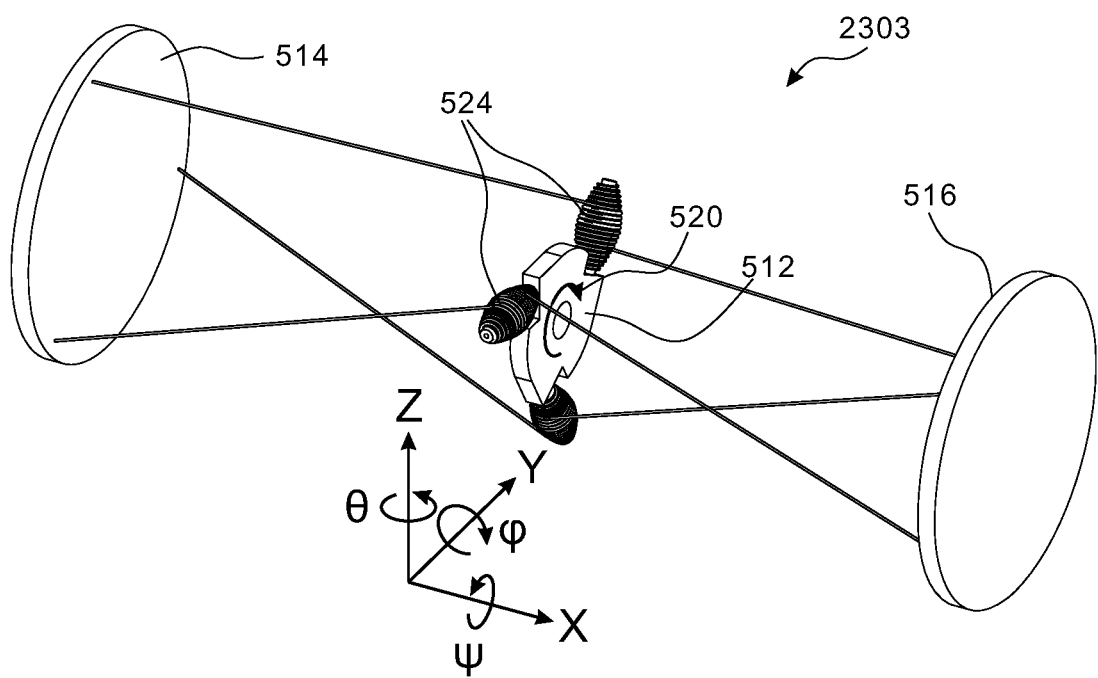
FIG. 23C is a perspective view of a linear constraint system using three double-sided variable radius spools.

Referring to FIG. 23C, a perspective view of the linear constraint 2303 using three double-sided variable radius spools is shown. The set of three double-sided variable radius spools 524 provides an unbalanced constraint that acts as a linear bearing permitting straight-line motion in the x-direction for the output member 512, and resisting forces in both the y- and z-directions. A counterbalancing moment 520 must be imposed to balance the constraint.

Figure 23D:
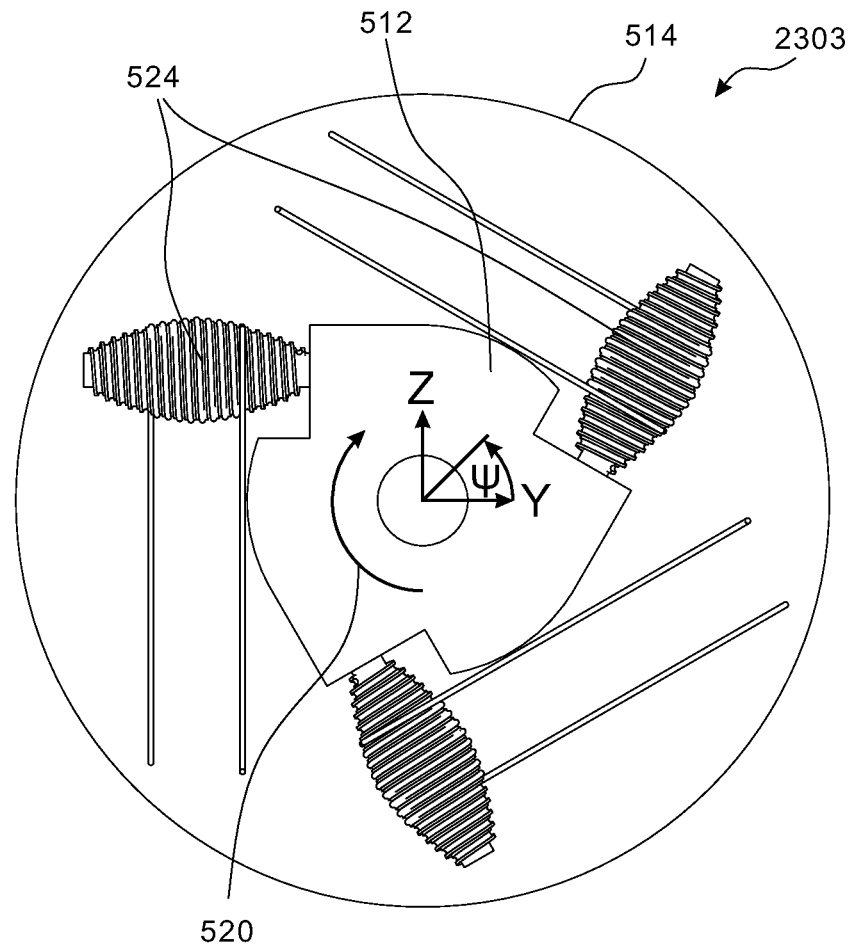
FIG. 23D is a right side view of the linear constraint system from FIG. 23C.

Referring to FIG. 23D, a right side view of the linear constraint 2303 from FIG. 23C is shown. Because positive tension in the cables will impose a moment in the positive $\psi$-direction, the counterbalancing moment 520 must be imposed in the negative $\psi$-direction to balance the constraint.

Figure 23E:
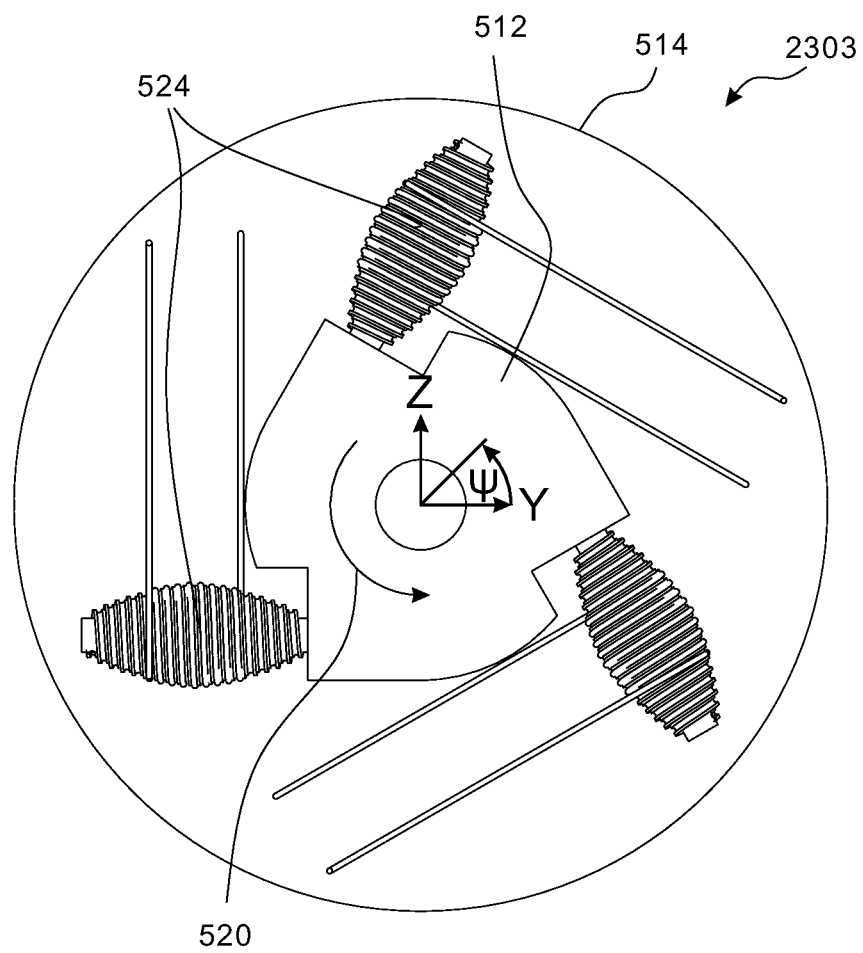
FIG. 23E is a right side view of a linear constraint system similar to that of FIG. 23C, but with the output member rotated 180 degrees about its Y-axis.

Referring to FIG. 23E, a right side view of the linear constraint 2303 from FIG. 23C, but with the constraints flipped 180 degrees about the Y-axis, is shown. Because positive tension in the cables will impose a moment in the negative $\psi$-direction, the counterbalancing moment 520 must be imposed in the positive $\psi$-direction to balance the constraint.

It is noted that a combination of the constraints of FIGS. 23D-E can balance the unbalanced moments about the X-axis to achieve a balanced constraint.

Figure 23F:
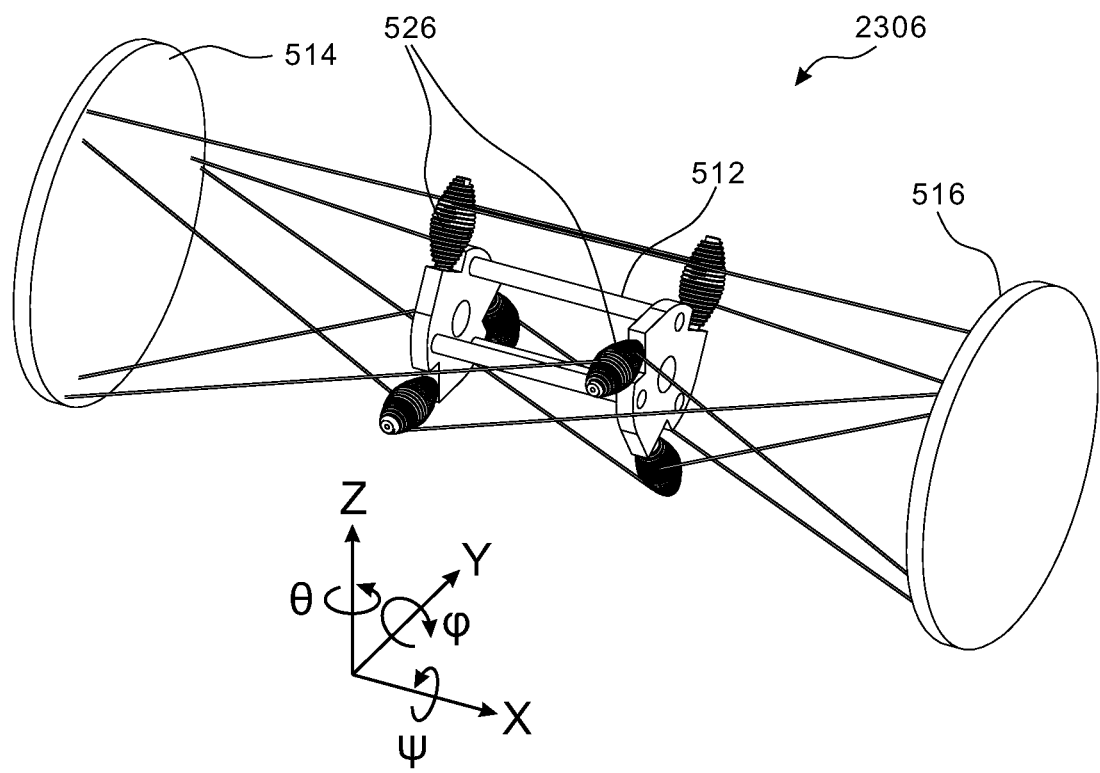
FIG. 23F is a perspective view of a linear constraint system combining the linear constraints of FIGS. 23D and FIG. 23E.

Referring to FIG. 23F, a perspective view of a linear constraint 2306 using six double-sided variable radius spools is shown. A set of six double-sided variable radius spools 526 provides a balanced constraint that acts as a linear bearing in the x-direction for the output member 512 and resists forces in the y- and z-directions, and resists moments about the and z-axes.

It is noted that, although, for the purpose of illustration, these combination constraints have been shown with moving spools similar to FIG. 21, any of them can be achieved with combination constraints using stationary spools similar to FIGS. 16-18 and FIG. 20.

It is noted that linear constraints using variable radius spools similar to those shown here can be suitable for use as linear guide elements in a positioning system.

It is noted that many other combinations and configurations of constraints using cables and variable-radius spools are possible than what have been shown here.

It is noted that it is possible to drive the output member in any of the constraints shown or not shown by driving the rotation of the variable radius spools using an actuator.

Figure 24:
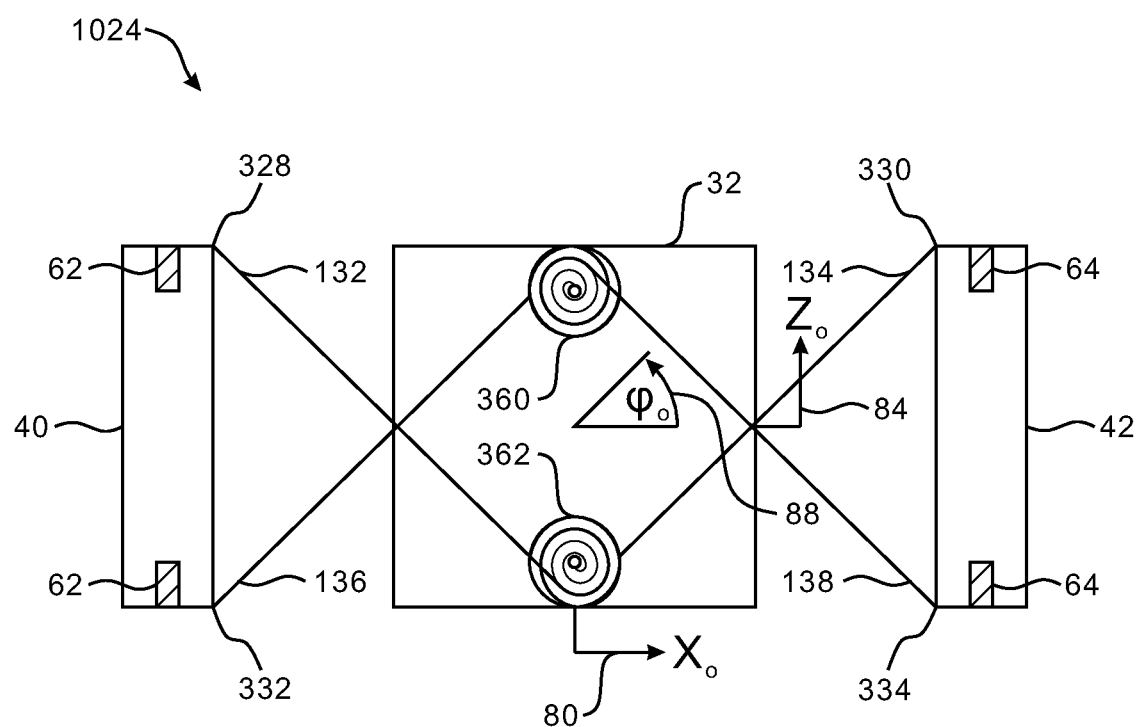
FIG. 24 is a front view schematic of a positioning system with a cable constraint for preventing displacement of an output member in the z-direction.

Referring to FIG. 24, a front view schematic of a positioning system 1024 is shown, where the movement and constraining cables 34 include four z-constraint cables 132, 134, 136, and 138 that constrain the output member 32 from displacing in the z-direction. A double-sided variable radius spool 360 and a double-sided variable radius spool 362 complete a balanced constraint that maintains the lengths of cables 132, 134, 136, and 138 equivalent to that needed for maintaining a constant z-coordinate for output member 32 over its range of motion. It is noted that the x-coordinate linear carriages 44 and 46 and the x-direction linear guides 66 and 68 have not been shown, for the purpose of clarity.

Referring to FIG. 24, the z-constraint cable 132 extends from and is anchored to the anchoring point 328 near the top of y-coordinate linear carriage 40, and wraps around the front half of the double-sided variable radius spool 362, which is mounted near the bottom of output member 32. The second z-constraint cable 134 extends from and is anchored to the anchoring point 330 near the top of y-coordinate linear carriage 42, and wraps around the rear half of the double-sided variable radius spool 362. To balance the forces and moments from the z-constraint cables 132 and 134 on the output member 32, the z-constraint cable 136 extends from and is anchored to the anchoring point 332 near the bottom of y-coordinate linear carriage 40, and wraps around the rear half of the double-sided variable radius spool 360, which is mounted near the top of output member 32, and the fourth z-constraint cable 138 extends from and is anchored to the anchoring point 334 near the bottom of y-coordinate linear carriage 42, and wraps around the front half of the double-sided variable radius spool 360. The pair of cables 132 and 136, and the pair of cables 134 and 138 thus form a symmetrical arrangement and the system is in equilibrium with equal tensions in the two cables 132 and 136, and equal tensions in the two cables 134 and 138, neglecting external forces.

Figure 25:
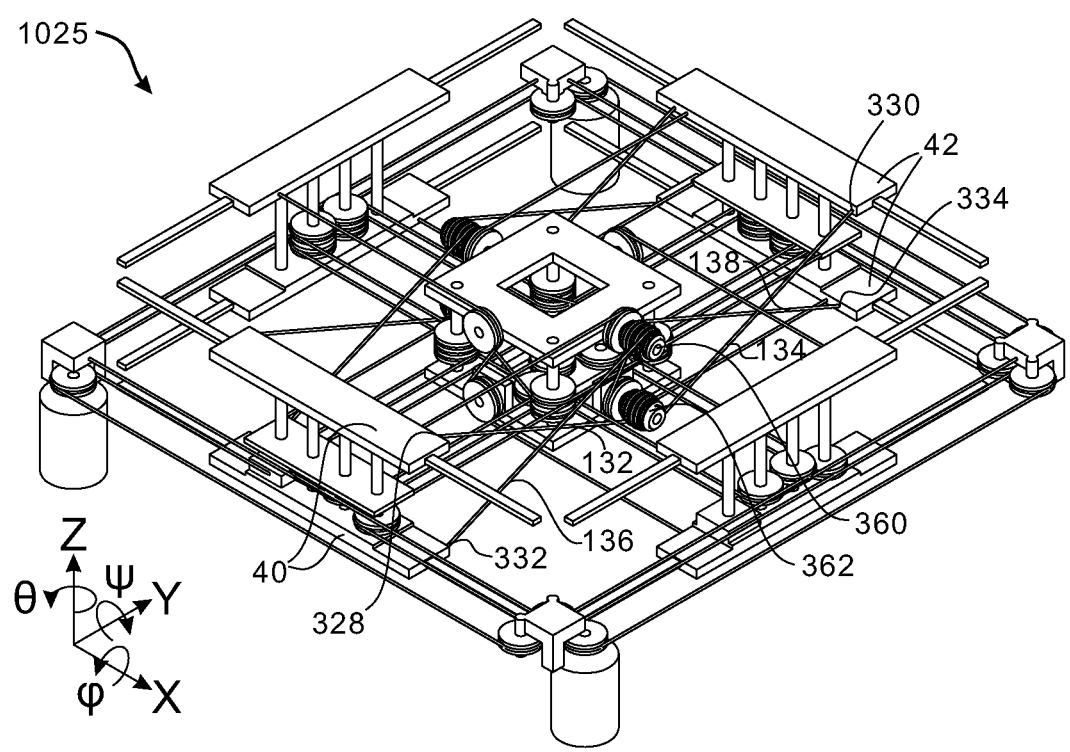
FIG. 25 is a perspective view of a positioning system with cable constraints for driving an output member and an output pulley and preventing rotation of the output member about its X-, Y-, and Z-axes and preventing displacement in its z-direction.

Referring to FIG. 25, a perspective view of a positioning system 1025 is shown, where the movement and constraining cables 34 include all seven of the cable constraints from FIG. 4, FIG. 6, FIG. 8, FIG. 9, FIG. 11, FIG. 13, and FIG. 24. The combination of constraints results in a constraint that $\Delta x_o = \Delta x_1 = \Delta x_2 = -\Delta\theta_1 R_1$, $\Delta y_o = \Delta y_1 = \Delta y_2 = -\Delta\theta_2 R_2$, $\Delta\theta_o = 0$, $\Delta\phi_o = 0$, $\Delta\psi_o = 0$, $$\Delta\theta_4 = \frac{\Delta\theta_3 R_3 + \Delta\theta_1 R_1}{R_4},$$

and $\Delta z_o 32$ 0. Thus, the combination of the seven constraints constrains the output member 32 and the two x-coordinate linear carriages 44 and 46 to move in sync with each other in the x-direction and to be controlled by the actuator 350, and constrains the output member 32 and the two y-coordinate linear carriages 40 and 42 to move in sync with each other in the y-direction and to be controlled by the actuator 352, and constrains the output member 32 from rotating about its Z-axis, its Y-axis, and its X-axis, and constrains the output pulley 242 to be controlled by both actuators 350 and 354, and constrains the output member 32 from displacing in the z-direction. It is noted that there is an identical Z-constraint system on the opposite side of the output member 32 in order to have a symmetrical constraint, although that is not necessary, in general.

Referring to FIG. 25, six of the constraints are described in more detail in reference to FIGS. 3-14. The double-sided variable radius spools 360 and 362, and the constraining cables 132, 134, 136, and 138 form a seventh constraint, described in more detail in the description of FIG. 24, for constraining the output member 32 from displacing in the Z-direction. The other features in FIG. 25 are discussed in reference to FIG. 5, FIG. 7, FIG. 10, and FIG. 14.

It is recognized that the embodiment shown in FIG. 25 constitutes a set of cable constraints driving the x- and y-degrees of freedom, driving an additional degree of freedom, and constraining all four additional degrees of freedom of the output member 32.

It is noted that the set of cable constraints shown in the embodiment of FIG. 25 is not unique in its ability to drive and constrain the various degrees of freedom of output member 32. Other cable constraints and other combinations of constraints are possible.

Figure 26:
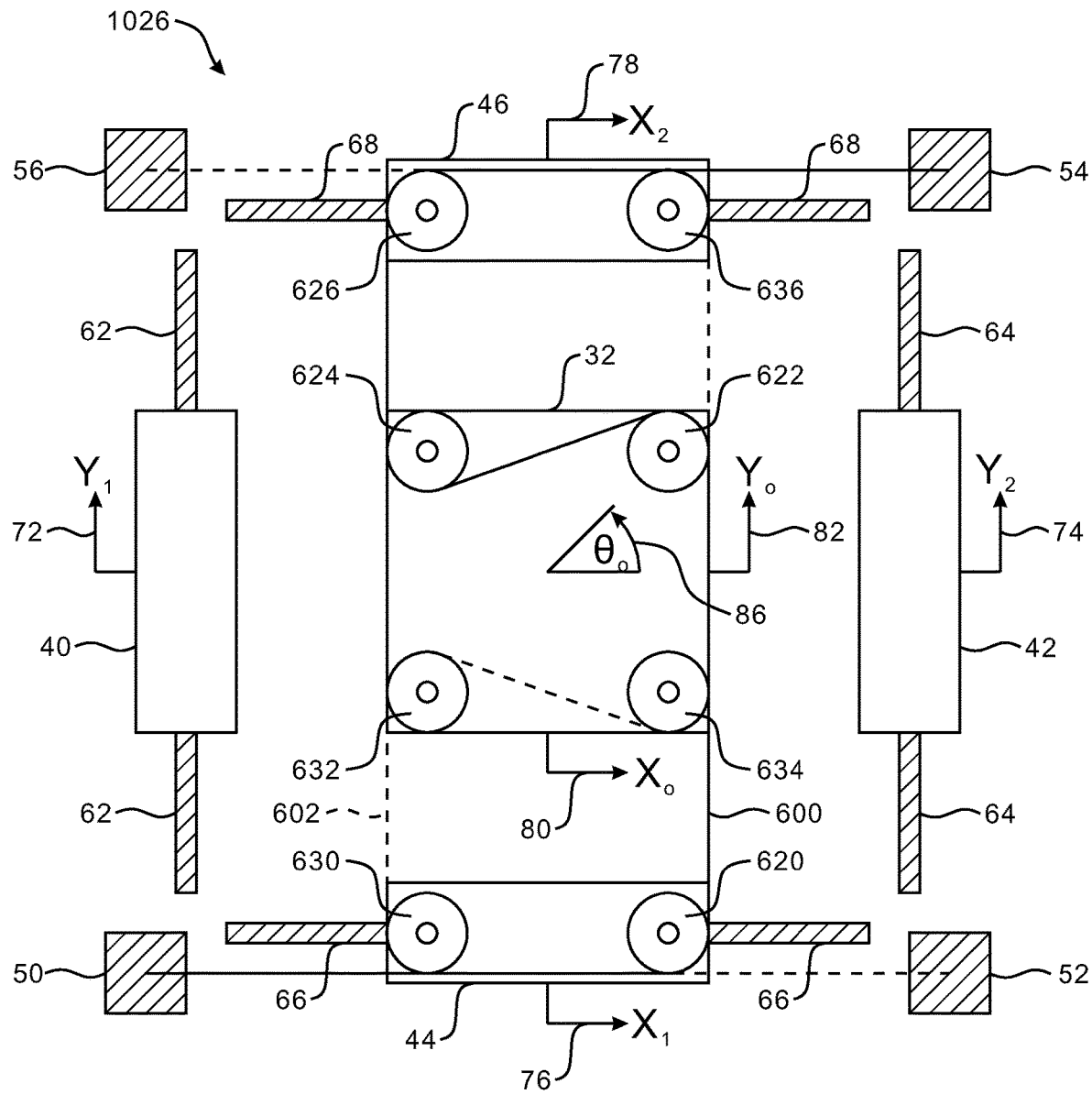
FIG. 26 is a top view schematic of a positioning system with a cable constraint for coupling the relative displacements of x-coordinate linear carriages with the rotation of an output member about its Z-axis.

Referring to FIG. 26, a top view schematic of a positioning system 1026 is shown, where the movement and constraining cables 34 include a pair of x-θ-constraint cables 600 and 602 that couple the relative displacements of x-coordinate linear carriages 44 and 46 with the rotation of output member 32 about its Z-axis.

Referring to FIG. 26, the x-θ-constraint cable 600 extends from and is anchored to the anchoring position 50, wraps around a pulley 620, which is mounted on the x-coordinate linear carriage 44, wraps around a pulley 622, which is mounted on the output member 32, wraps around a pulley 624, which is mounted on the output member 32, wraps around a pulley 626, which is mounted on the x-coordinate linear carriage 46, and is anchored to the anchoring position 54. To balance the forces and moment from the x-θ-constraint cable 600 on the x-coordinate linear carriages 44 and 46 and the output member 32, the second x-θ-constraint cable 602, which is shown as a broken line, extends from and is anchored to the anchoring position 52, wraps around a pulley 630, which is mounted on the x-coordinate linear carriage 44, wraps around a pulley 632, which is mounted on the output member 32, wraps around a pulley 634, which is mounted on the output member 32, wraps around a pulley 636, which is mounted on the x-coordinate linear carriage 46, and is anchored in the anchoring position 56. The cables 600 and 602 thus form a symmetrical arrangement and the system is in equilibrium with equal tensions in the two cables, neglecting external forces.

Based on the constant lengths of the cables, the cable constraint of FIG. 26 results in a constraint $$\Delta \theta_o d = \frac{\Delta x_2 - \Delta x_1}{2},$$

to a first-order approximation, where d is half of the distance between adjacent pulleys' centers on output member 32. Thus, the cable constraint of FIG. 26 constrains the relative displacements of x-coordinate linear carriages 44 and 46 to be coupled to the rotation of output member 32 about its Z-axis. The cable constraint also leaves the output member 32 free to translate because the pulleys can roll along the cable without changing its length.

The constraint of FIG. 26 can be combined with, for example, the constraint of FIG. 2 to constrain the x-coordinate linear carriages 44 and 46 to move in sync with each other and to prevent rotation of the output member 32 about its Z-axis.

Figure 27:
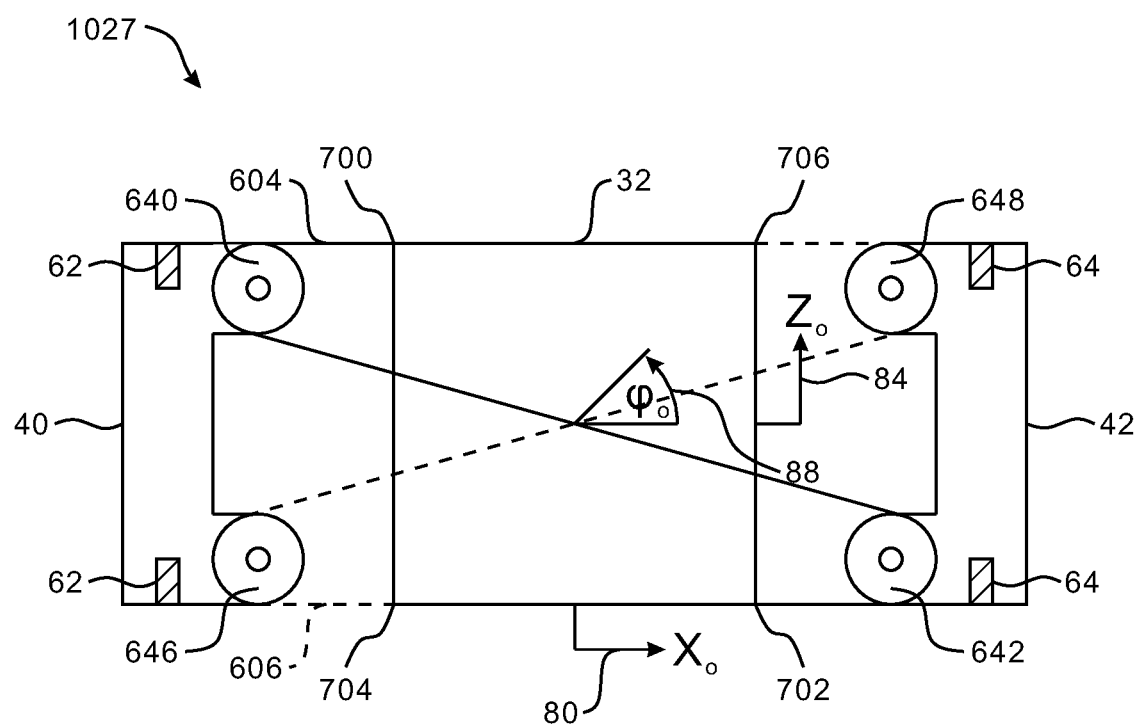
FIG. 27 is a front view schematic of a positioning system a cable constraint for preventing rotation of an output member about its Y-axis.

Referring to FIG. 27, a front view schematic of a positioning system 1027 is shown, where the movement and constraining cables 34 include a pair of co-constraint cables 604 and 606 that constrain the output member 32 from rotating about its Y-axis. It is noted that the x-coordinate linear carriages 44 and 46 and the x-direction linear guides 66 and 68 have not been shown, for the purpose of clarity.

Referring to FIG. 27, the φ-constraint cable 604 extends from and is anchored to the anchoring point 700 near the top of output member 32, wraps around a pulley 640, which is mounted on the y-coordinate linear carriage 40, wraps around a pulley 642, which is mounted on the y-coordinate linear carriage 42, and is anchored to the anchoring point 702 near the bottom of output member 32. To balance the moment from the φ-constraint cable 604 on the output member 32, the second φ-constraint cable 606, which is shown as a broken line, extends from and is anchored to the anchoring point 704 near the bottom of output member 32, wraps around a pulley 646, which is mounted on the y-coordinate linear carriage 40, wraps around a pulley 648, which is mounted on the y-coordinate linear carriage 42, and is anchored to the anchoring point 706 near the top of output member 32. The cables 604 and 606 thus form a symmetrical arrangement and the system is in equilibrium with equal tensions in the two cables, neglecting external forces.

Based on the constant lengths of the cables, the cable constraint of FIG. 27 results in a constraint that $\Delta \phi_o = 0$. Thus, the cable constraint of FIG. 27 constrains the output member from rotating about its Y-axis. The cable constraint also leaves the output member 32 free to translate.

The constraint of FIG. 27 can be used as a substitute for the constraint of FIG. 8, or, after applying an appropriate coordinate transformation, the constraints of FIG. 6 or FIG. 9.

Figure 28:
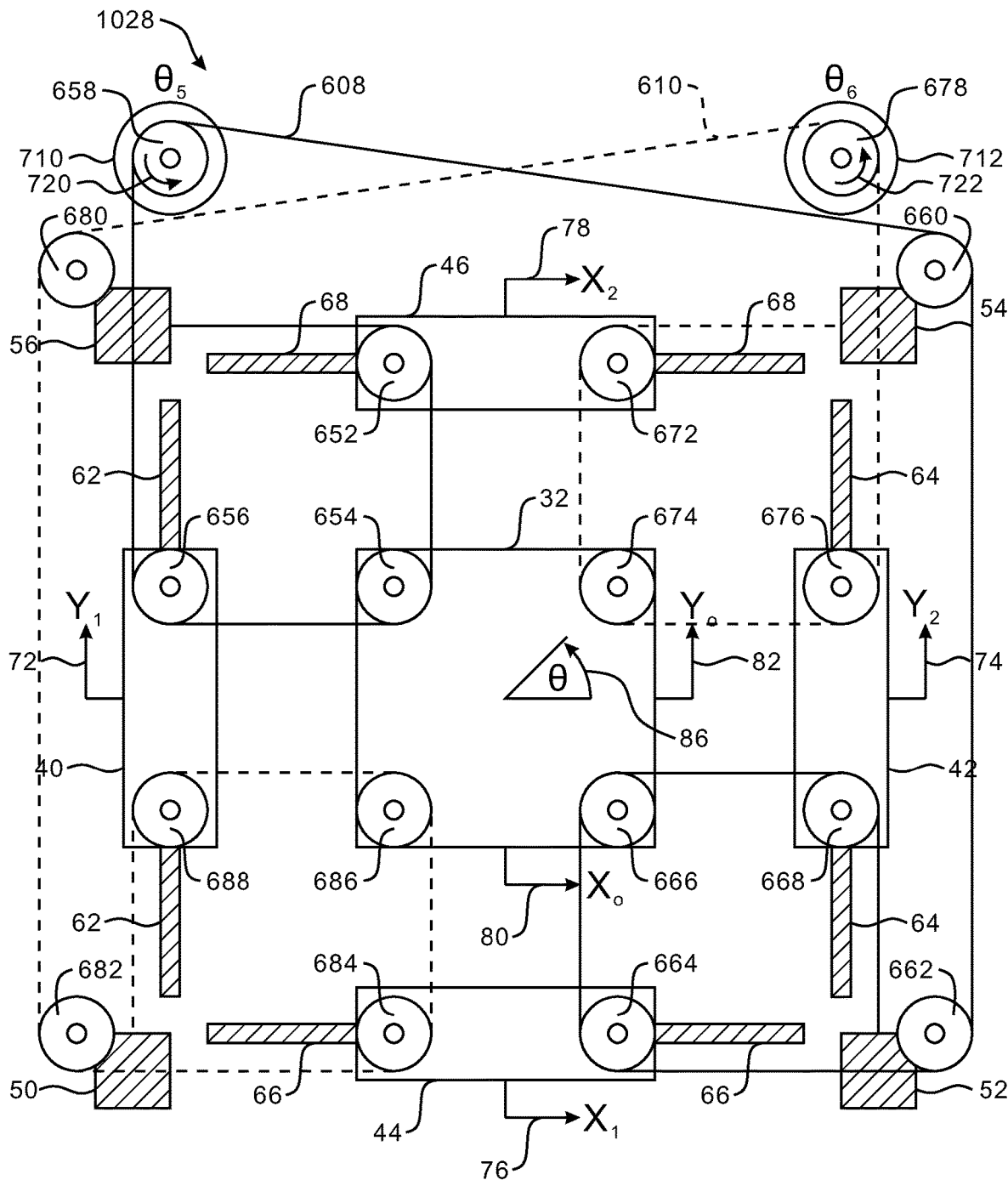
FIG. 28 is a top view schematic of a positioning system with a cable constraint for coupling the displacements of a set of x- and y-linear carriages and driving an output member in the x- and y-directions.

Referring to FIG. 28, a top view schematic of a positioning system 1028 is shown, where the movement and constraining cables 34 include an xy-drive constraint cable 608 and a xy-drive constraint cable 610 that couple the displacements of the four linear carriages 40, 42, 44, and 46 and couple the displacement of the output member 32 to the rotations of a drive pulley 658 and a drive pulley 678, which are driven by an actuator 710 and an actuator 712, respectively. The rotation of the drive pulley 658 is measured by a rotational angle 720, which is referred to as $\theta_5$. The rotation of the drive pulley 678 is measured by a rotational angle 722, which is referred to as $\theta_6$. The actuators 710 and 712 are fixed to the anchoring positions 56 and 54, respectively, through a frame which, for the purpose of clarity, is not shown.

Referring to FIG. 28, the xy-drive constraint cable 608 extends from and is anchored to the anchoring position 56, wraps around a pulley 652, which is mounted to the x-coordinate linear carriage 46, wraps around a pulley 654, which is mounted to the output member 32, wraps around a pulley 656, which is mounted to the y-coordinate linear carriage 40, wraps without slipping around a drive pulley 658, which is mounted to an actuator 710, wraps around a pulley 660, which is mounted to the anchoring position 54, wraps around a pulley 662, which is mounted to the anchoring position 52, wraps around a pulley 664, which is mounted to the x-coordinate linear carriage 44, wraps around a pulley 666, which is mounted to the output member 32, wraps around a pulley 668, which is mounted to the y-coordinate linear carriage 42, and is anchored to the anchoring position 52. To balance the forces from the xy-drive constraint cable 608 on the linear carriages 40, 42, 44, and 46, and the output member 32, the second xy-drive constraint cable 610, which is shown as a broken line, extends from and is anchored to the anchoring position 54, wraps around a pulley 672, which is mounted to the x-coordinate linear carriage 46, wraps around a pulley 674, which is mounted to the output member 32, wraps around a pulley 676, which is mounted to the y-coordinate linear carriage 42, wraps without slipping around a drive pulley 678, which is mounted to an actuator 712, wraps around a pulley 680, which is mounted to the anchoring position 56, wraps around a pulley 682, which is mounted to the anchoring position 50, wraps around a pulley 684, which is mounted to the x-coordinate linear carriage 40, wraps around a pulley 686, which is mounted to the output member 32, wraps around a pulley 688, which is mounted to the y-coordinate linear carriage 40, and is anchored to the anchoring position 50. The cables 608 and 610 thus form a symmetrical arrangement and the system is in equilibrium with equal tensions in the two cables, neglecting external forces.

Based on the constant lengths of the cables, the cable constraint of FIG. 28 results in a constraint $\Delta x_2 - \Delta x_1 = \Delta y_1 - \Delta y_2$, that is, the "rotation" of the x-coordinate linear carriages 44 and 46 about the center of the workspace 36 is equal to the "rotation" of the y-coordinate linear carriages 40 and 42 about the center of the workspace 36. The cable constraint of FIG. 28 also results in a constraint $$\Delta x_o = \frac{\Delta \theta_5 R_5 + \Delta \theta_6 R_6}{4} \text{ and } \Delta y_o = \frac{-\Delta \theta_5 R_5 + \Delta \theta_6 R_6}{4},$$

that is, the displacement of the output member 32 in the x-direction is a weighted sum of the rotations of drive pulleys 658 and 678, and the displacement of the output member 32 in the y-direction is a weighted difference of the rotations of drive pulleys 658 and 678, where $R_5$ is the radius of drive pulley 658 and $R_6$ is the radius of the drive pulley 678. Thus, the cable constraint of FIG. 27 couples the displacements of the four linear carriages 40, 42, 44, and 46 and couples the displacement of the output member 32 to the rotations of drive pulleys 658 and 678, which are driven by the actuators 710 and 712, respectively.

The constraint of FIG. 28 can be combined with, for example, the constraints of FIG. 2 and FIG. 4 to constrain the output member 32 and the x-coordinate linear carriages 44 and 46 to move in sync with each other in the x-direction and to constrain the output member 32 and the y-coordinate linear carriages 40 and 42 to move in sync with each other in the y-direction and to drive the output member in the x- and y-directions via the actuators 710 and 712.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

INCORPORATION BY REFERENCE

The entire disclosure of each of the publications, patent documents, and other references referred to herein is incorporated herein by reference in its entirety for all purposes to the same extent as if each individual source were individually denoted as being incorporated by reference.

EQUIVALENTS

The invention may be embodied in other specific forms without departing from the spirit or essential characteristics thereof. The foregoing embodiments are therefore to be considered in all respects illustrative rather than limiting on the invention described herein. The true scope of the invention is thus indicated by the descriptions contained herein, as well as all changes that come within the meaning and ranges of equivalency thereof.

What is claimed is:

1. A method of positioning an output member, comprising the acts of:
    extending at least one cable of a plurality of cables from one or both linear carriages of a pair of x-coordinate linear carriages to the output member,
    extending at least one cable of the plurality of cables from one or both linear carriages of a pair of y-coordinate linear carriages to the output member, and
    arranging at least one cable of the plurality of cables to constrain movement of the output member in an additional degree of freedom other than the x- and y-directions, wherein,
        when movement of the output member in the additional degree of freedom is constrained by the at least one cable of the plurality of cables arranged to constrain movement of the output member in the additional degree of freedom, tension in one or more of the plurality of cables increases and simultaneously tension in one or more of the plurality of cables decreases.

2. A method of positioning an output member, comprising the acts of:
    extending at least one cable of a plurality of cables from one or both linear carriages of a pair of x-coordinate linear carriages to the output member, and
    extending at least one cable of the plurality of cables from one or both linear carriages of a pair of y-coordinate linear carriages to the output member, wherein
        the plurality of cables includes at least one cable having a centerline extending away from the output member in a direction having a z-direction component.

3. A method of positioning an output member, comprising the acts of:
    extending at least one cable of a plurality of cables from one or both linear carriages of a pair of x-coordinate linear carriages to the output member, and
    extending at least one cable of the plurality of cables from one or both linear carriages of a pair of y-coordinate linear carriages to the output member, wherein
        the plurality of cables includes at least one cable having a centerline extending away from the output member in a first direction having a first z-coordinate, and at least one cable having a centerline extending away from the output member in a second direction having a second z-coordinate different from the first z-coordinate.

4. A method of positioning an output member, comprising the acts of:
- extending at least one cable of a plurality of cables from one or both linear carriages of a pair of x-coordinate linear carriages to the output member, and
- extending at least one cable of the plurality of cables from one or both linear carriages of a pair of y-coordinate linear carriages to the output member, wherein
  - the plurality of cables includes at least nine linear segments of cable extending away from the output member, each linear cable segment extending from the output member to a respective one of the linear carriages.

5. A method of positioning an output member, comprising the acts of:
- extending at least one cable of a plurality of cables from one or both linear carriages of a pair of x-coordinate linear carriages to the output member, and
- extending at least one cable of the plurality of cables from one or both linear carriages of a pair of y-coordinate linear carriages to the output member,
- wherein
  - at least a portion of the plurality of cables includes a plurality of linear segments of cable extending away from the output member, and
  - a plane includes two or more non-collinear centerlines of the plurality of linear cable segments, and
  - at least one of the plurality of linear cable segments has a centerline that is not in the plane.

\* \* \* \* \*